United States Patent
Martin

(10) Patent No.: US 7,280,955 B2
(45) Date of Patent: Oct. 9, 2007

(54) UNIVERSAL SYSTEM COMPONENT EMULATOR WITH HUMAN READABLE OUTPUT

(76) Inventor: Joseph B. Martin, 54 Freezeland Rd., Arlington, VA (US) 22642

( * ) Notice: Subject to any disclaimer, the term of this patent is extended or adjusted under 35 U.S.C. 154(b) by 571 days.

(21) Appl. No.: 10/462,392

(22) Filed: Jun. 16, 2003

(65) Prior Publication Data

US 2003/0233637 A1  Dec. 18, 2003

Related U.S. Application Data

(60) Provisional application No. 60/389,557, filed on Jun. 18, 2002, now abandoned.

(51) Int. Cl.
*G06F 9/455* (2006.01)

(52) U.S. Cl. .................. 703/23; 717/105; 717/127; 717/134; 717/171; 714/26; 714/39

(58) Field of Classification Search .............. 703/23; 717/100, 124, 134, 105, 116, 121, 125, 127; 717/171; 714/26, 33, 45, 39
See application file for complete search history.

(56) References Cited

U.S. PATENT DOCUMENTS

| | | | | |
|---|---|---|---|---|
| 5,519,618 | A * | 5/1996 | Kastner et al. ............. | 701/120 |
| 5,904,727 | A * | 5/1999 | Prabhakaran ............... | 701/208 |
| 6,185,430 | B1 * | 2/2001 | Yee et al. ................... | 455/519 |
| 6,188,975 | B1 * | 2/2001 | Gay ............................ | 703/22 |
| 6,201,993 | B1 * | 3/2001 | Kruse et al. ................ | 607/30 |
| 6,278,965 | B1 * | 8/2001 | Glass et al. ................ | 703/22 |
| 6,453,459 | B1 * | 9/2002 | Brodersen et al. ......... | 717/100 |
| 6,836,780 | B1 * | 12/2004 | Opitz et al. .............. | 707/104.1 |
| 2002/0035627 | A1 * | 3/2002 | Sutou et al. ............... | 709/224 |
| 2002/0068583 | A1 * | 6/2002 | Murray ...................... | 455/456 |
| 2003/0093187 | A1 * | 5/2003 | Walker ....................... | 701/1 |
| 2003/0096621 | A1 * | 5/2003 | Jana et al. .................. | 455/456 |
| 2003/0144711 | A1 * | 7/2003 | Pless et al. ................. | 607/60 |
| 2003/0149594 | A1 * | 8/2003 | Beazley et al. ............. | 705/2 |
| 2003/0182099 | A1 * | 9/2003 | Mocek et al. .............. | 703/23 |
| 2004/0172446 | A1 * | 9/2004 | Dorman et al. ............ | 709/203 |
| 2005/0237308 | A1 * | 10/2005 | Autio et al. ............... | 345/173 |

* cited by examiner

*Primary Examiner*—Kamini Shah
*Assistant Examiner*—Kibrom K. Gebresilassie
(74) *Attorney, Agent, or Firm*—Barry Kramer; George N. Chaclas; Edwards Angell Palmer & Dodge, LLP

(57) ABSTRACT

A system and method for emulating or monitoring the communications behavior of any system component connected to a data bus. These functions are accomplished through the implementation of software component emulators (SCE) that encode and decode message data for any system component automatically. The present invention includes a means for development of an interface specification based on information contained in an Interface Control Document (ICD), and enables the user to create the ICD file without having to worry about formatting considerations, and view and define message data in a meaningful, human-readable format. The information in the ICD is automatically reduced to an application that combines the user-friendly, time-efficient aspects of a traditional SCE with the flexibility and universality of a bus monitor.

12 Claims, 25 Drawing Sheets

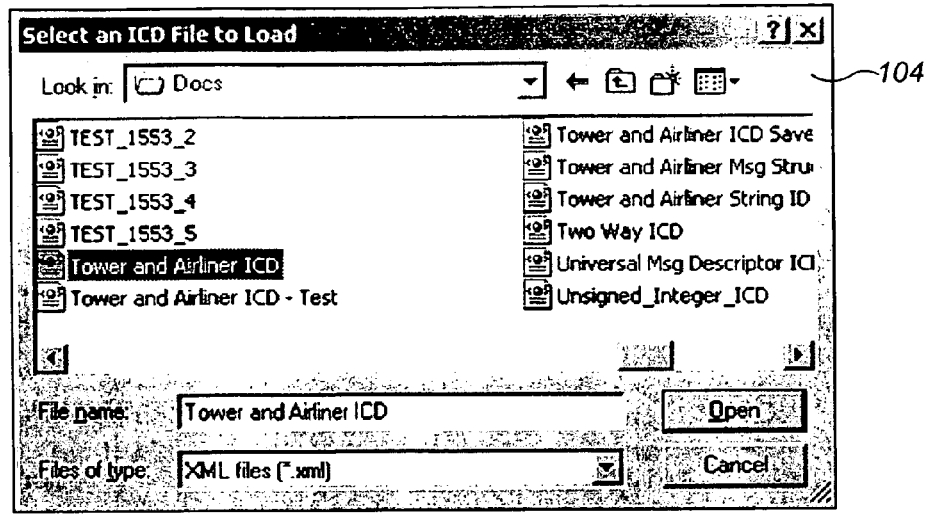
FIG. 3B
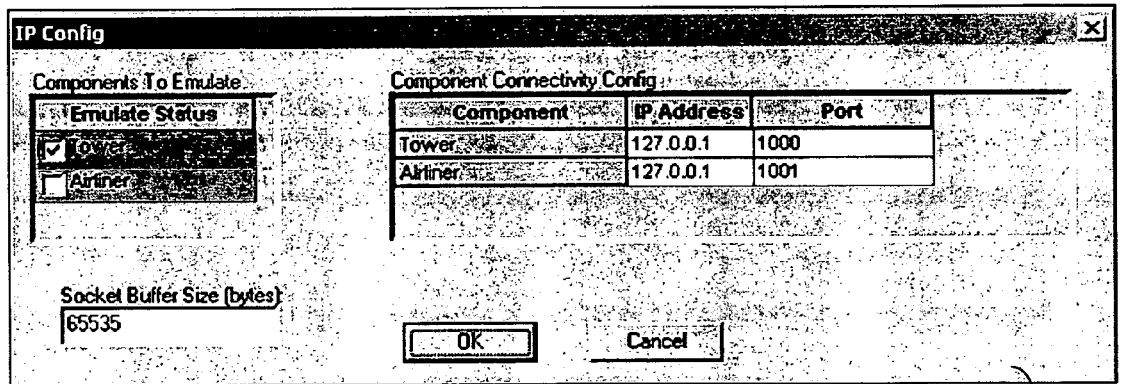
FIG. 3B1
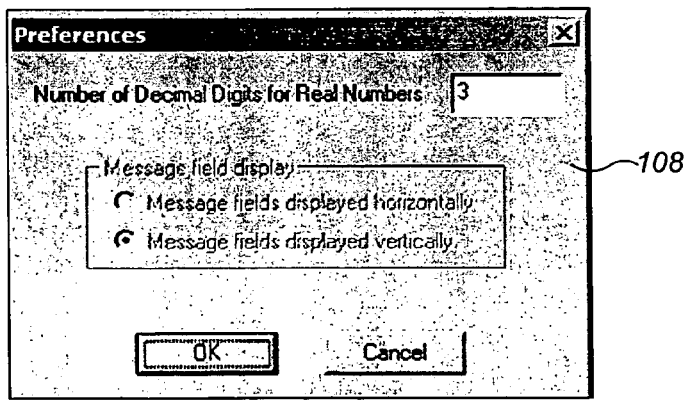
FIG. 3B2

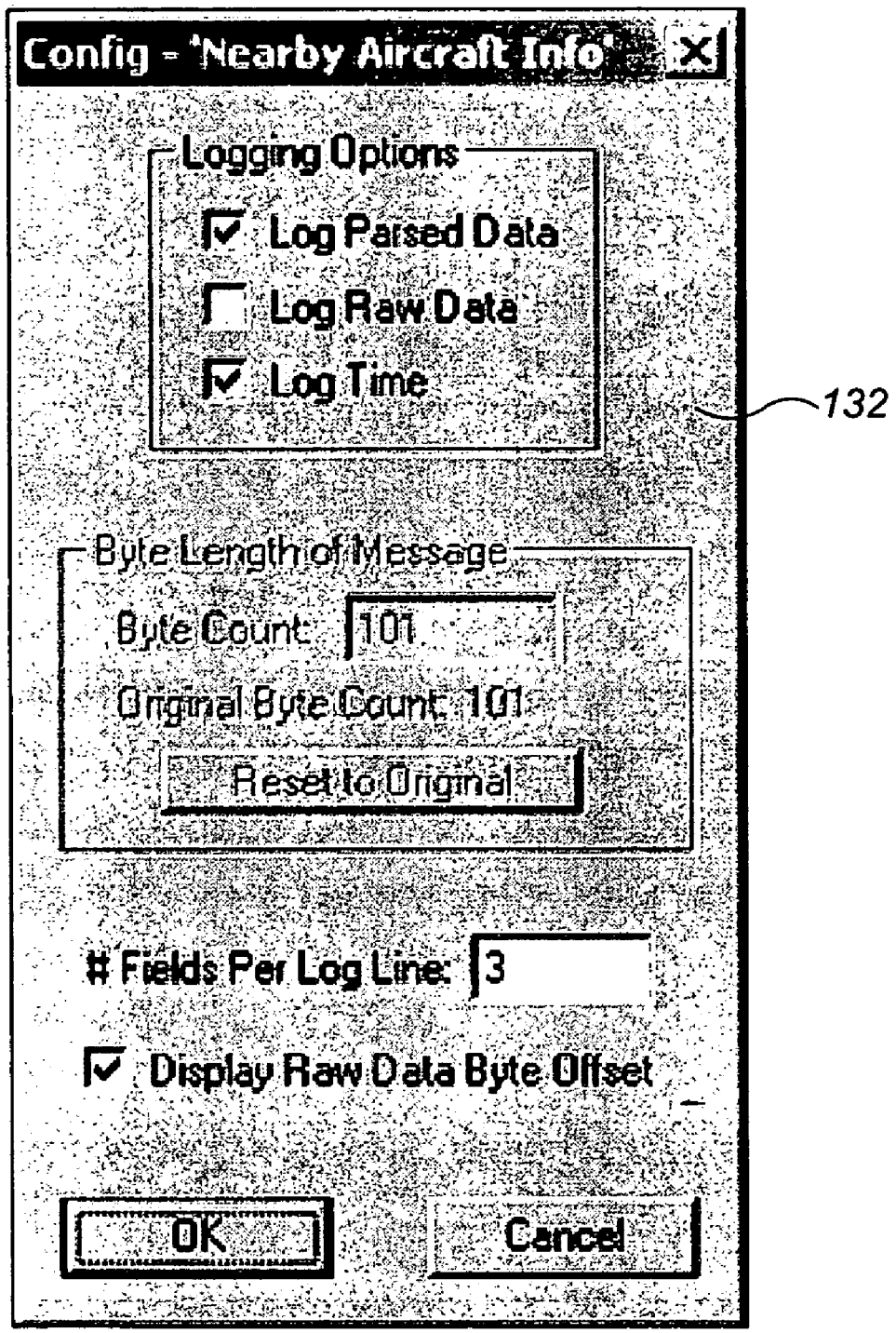
FIG. 3E2

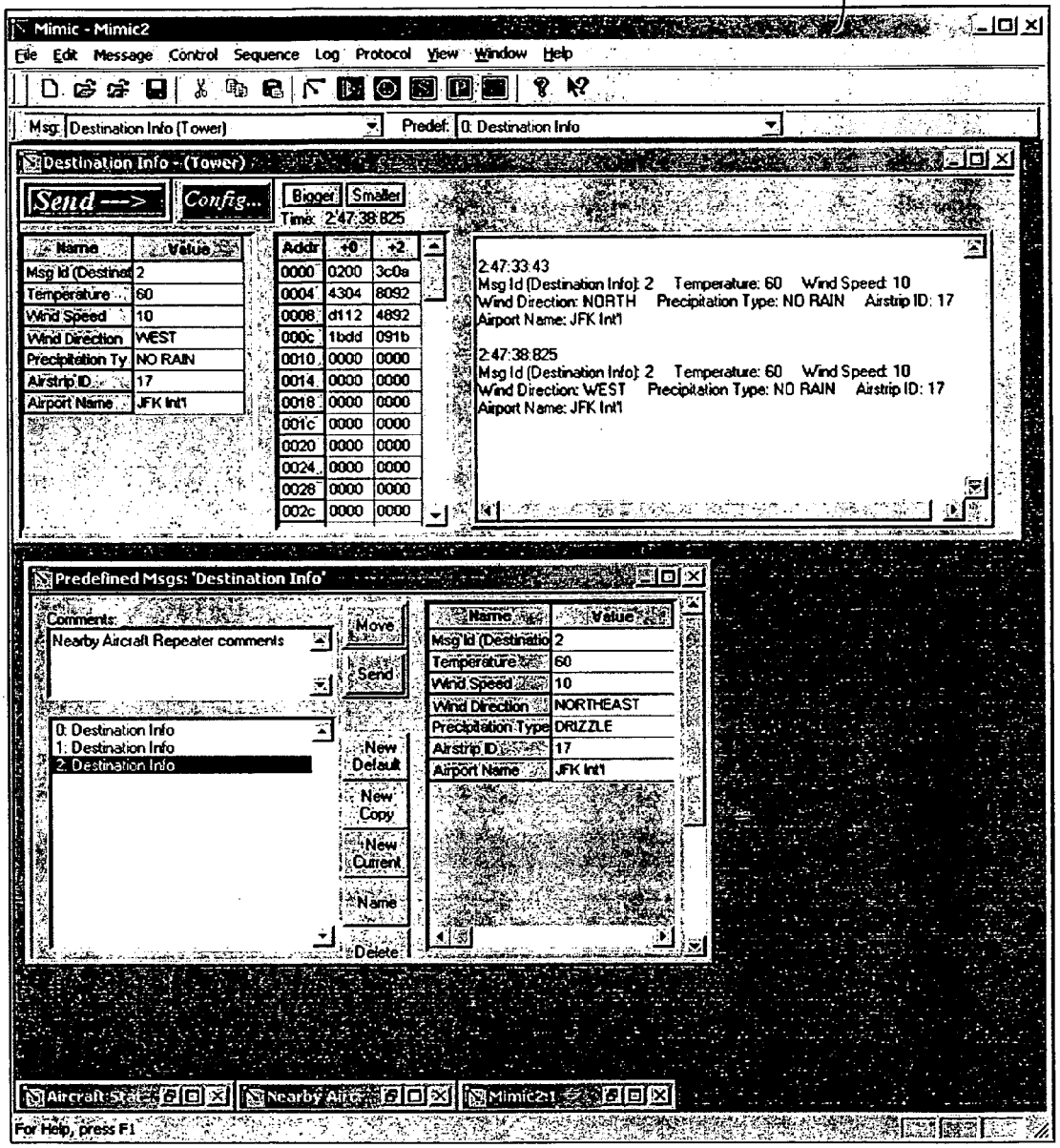
FIG. 3F1

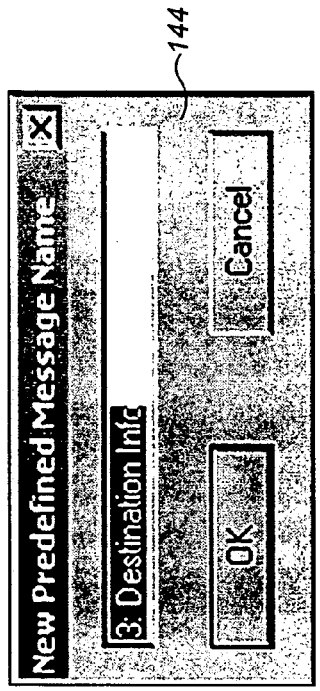
FIG. 3F2
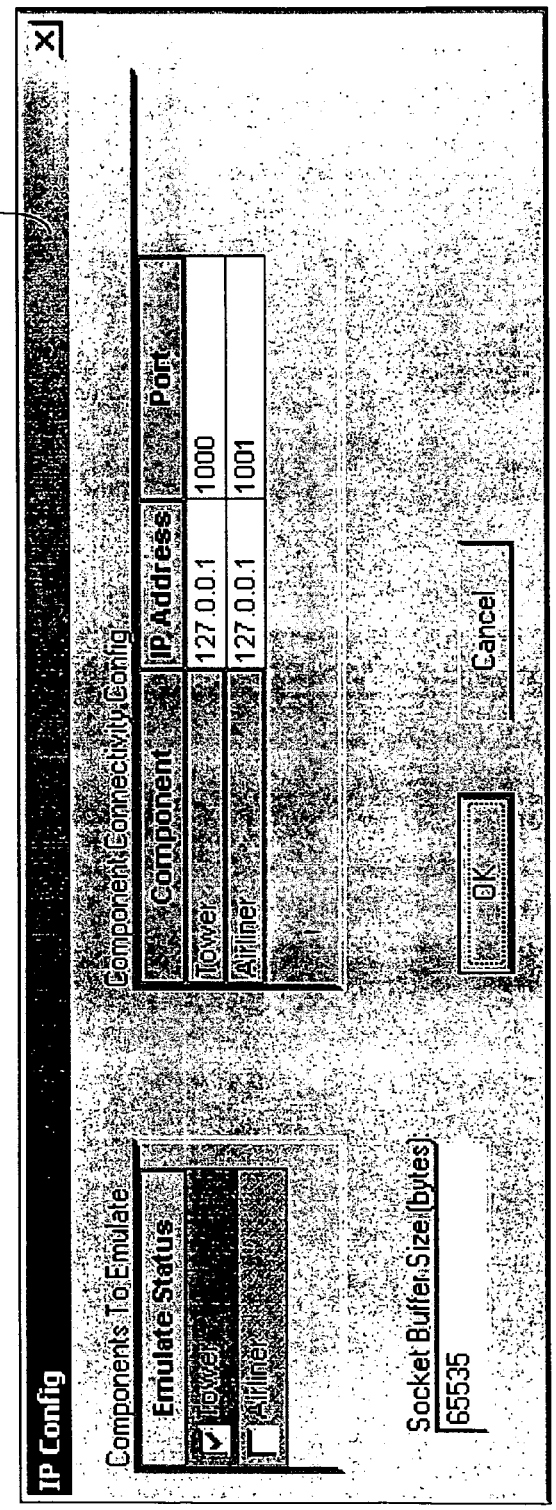
FIG. 3G

FIG. 3H2

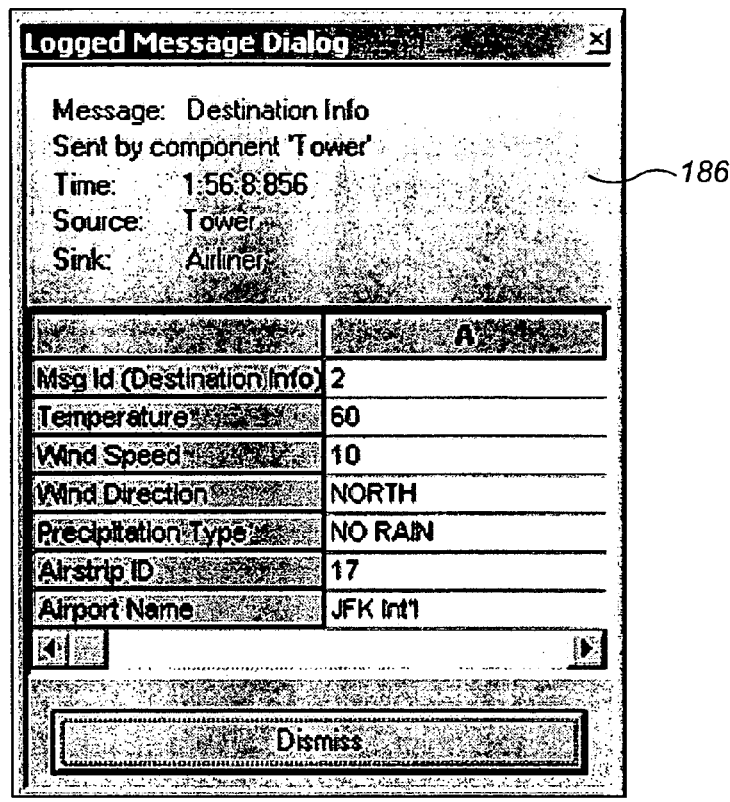
FIG. 3J2
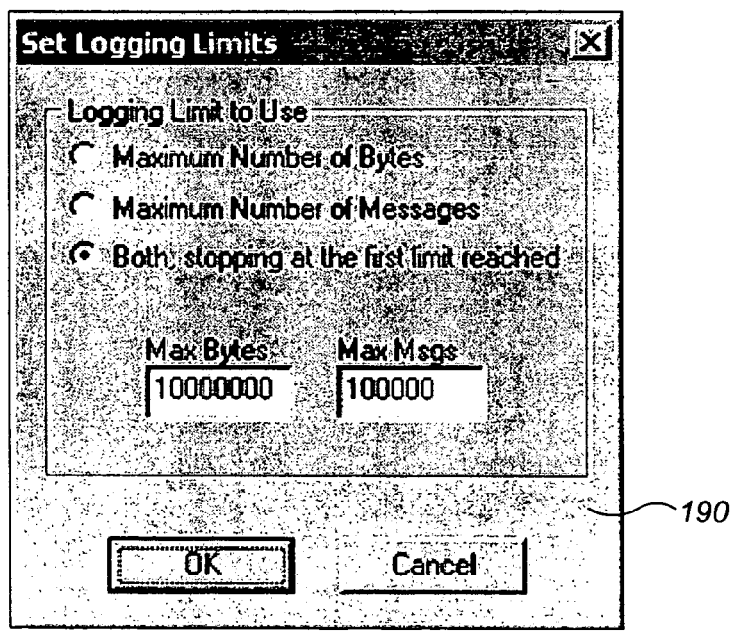
FIG. 3J3

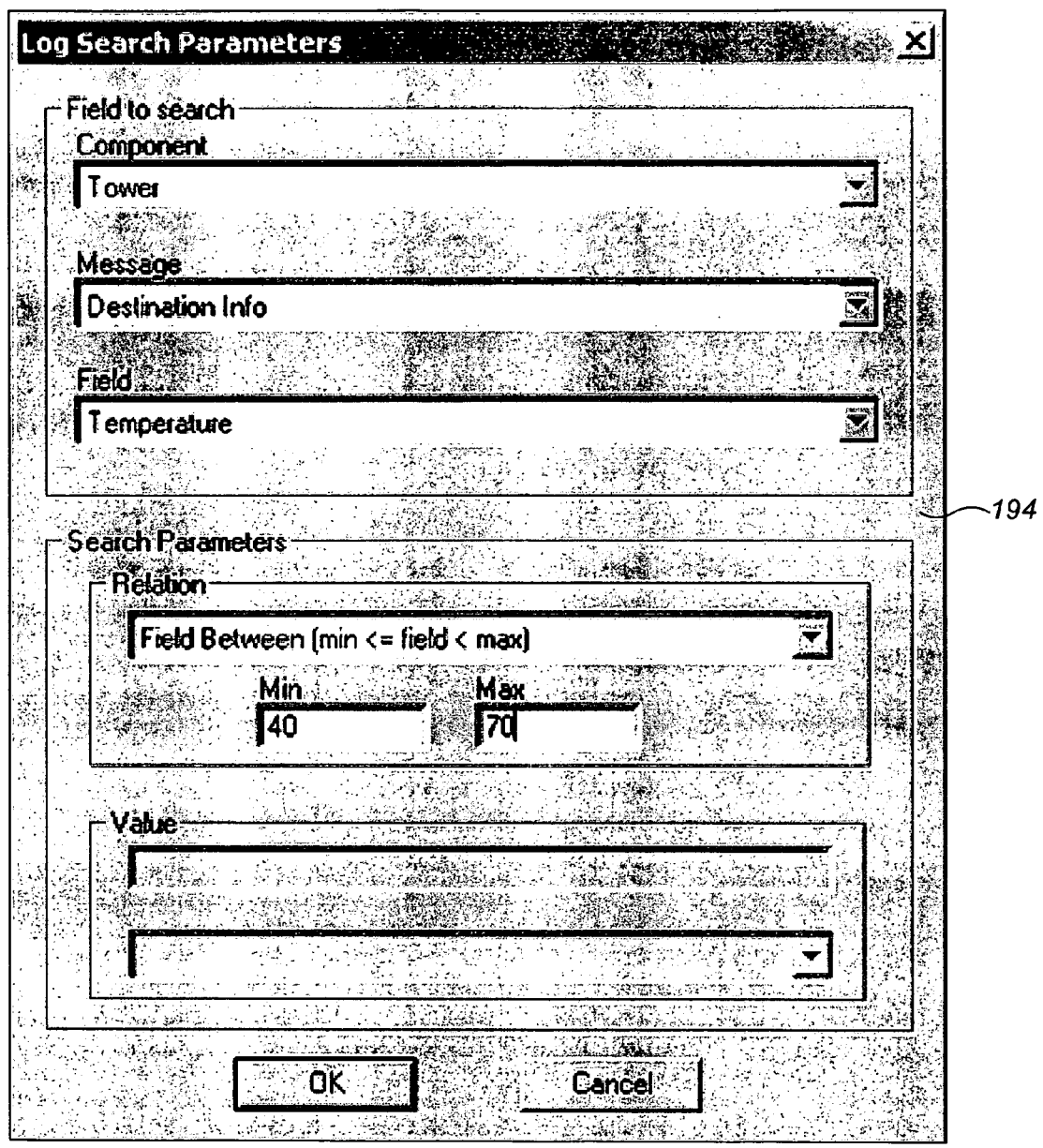
FIG. 3J4

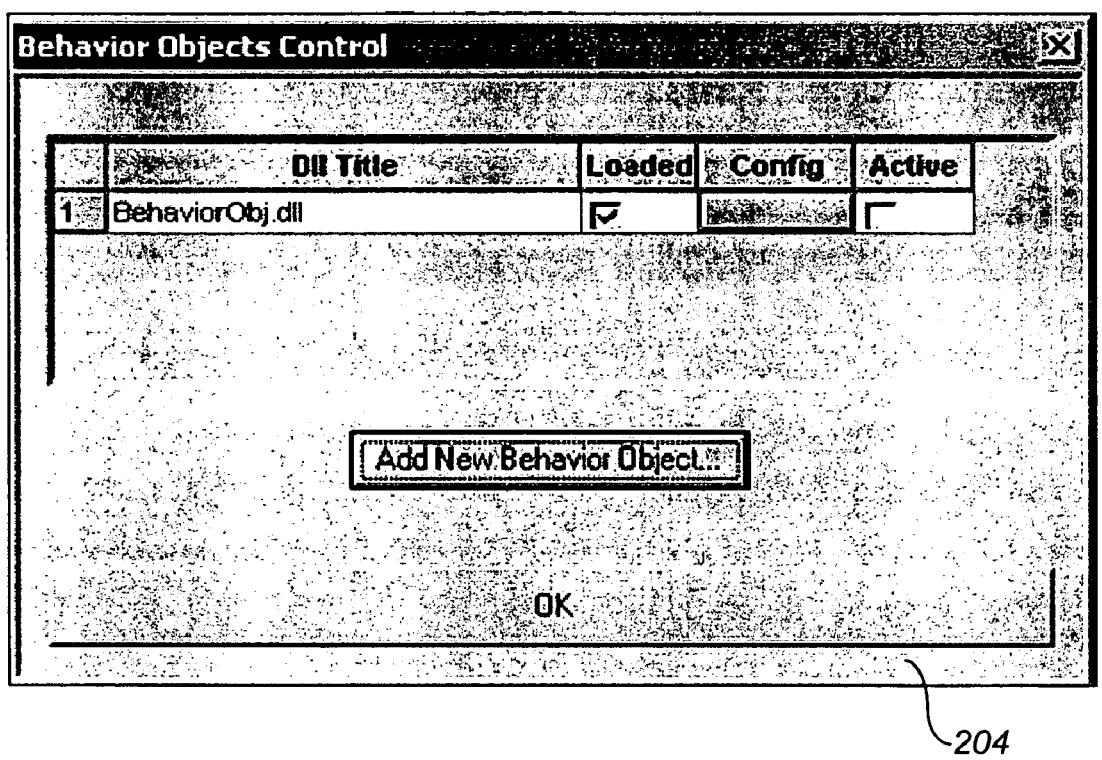
FIG. 3K1

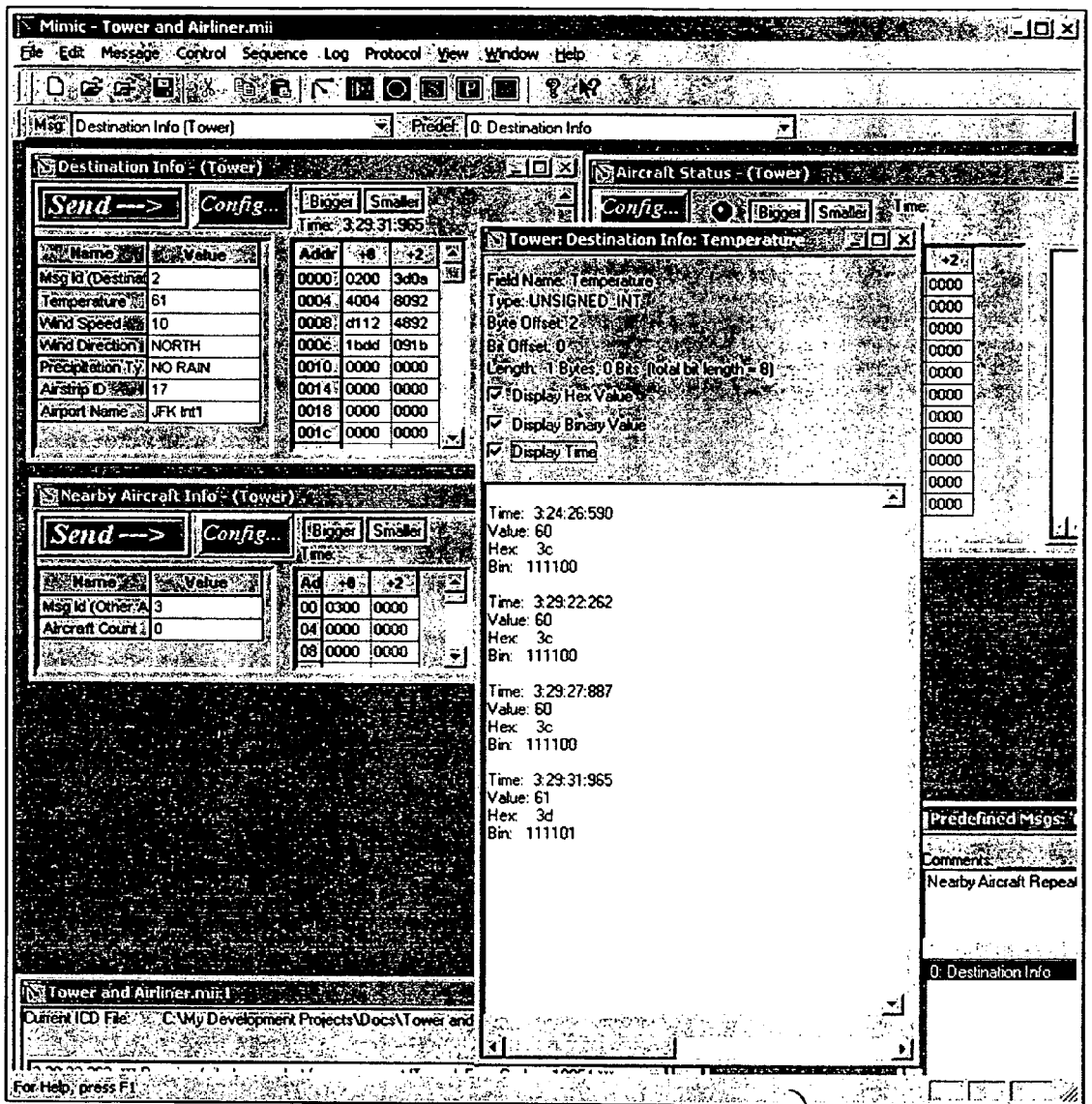
FIG. 3K2

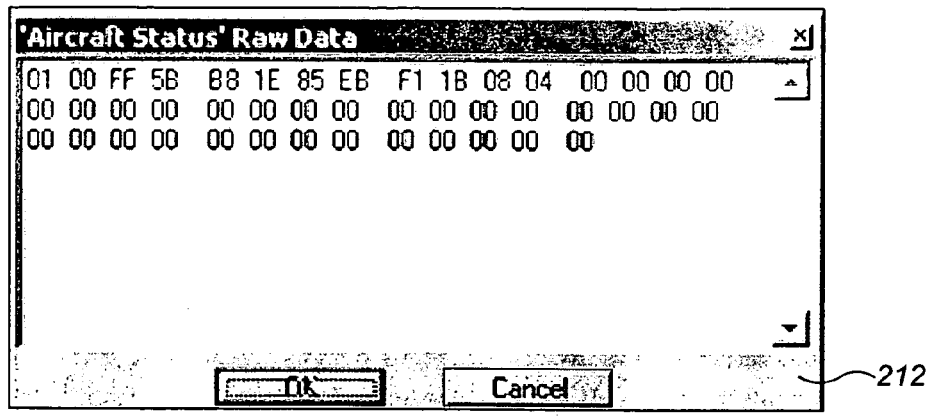
FIG. 3K3
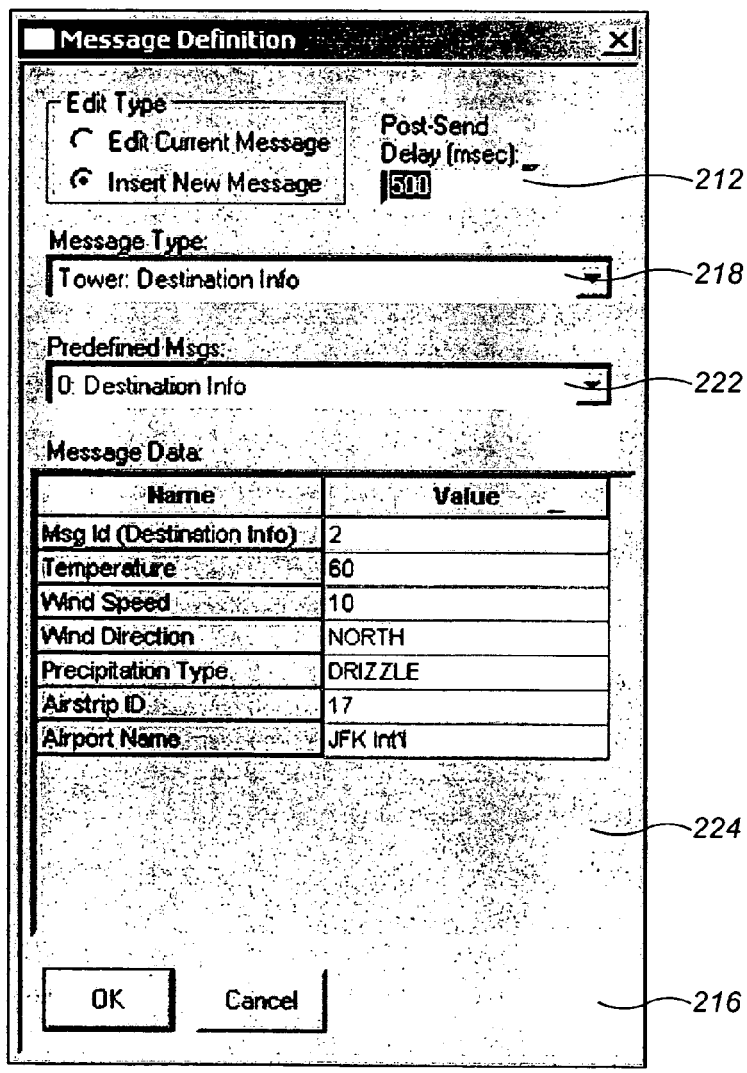
FIG. 3K4

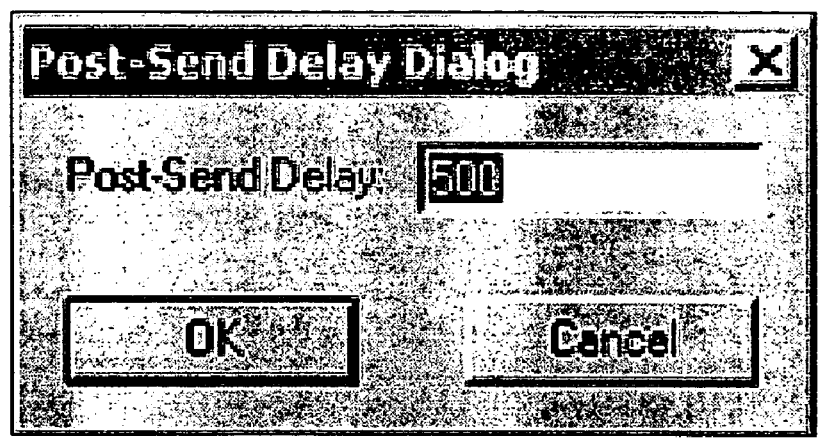
FIG. 3K5
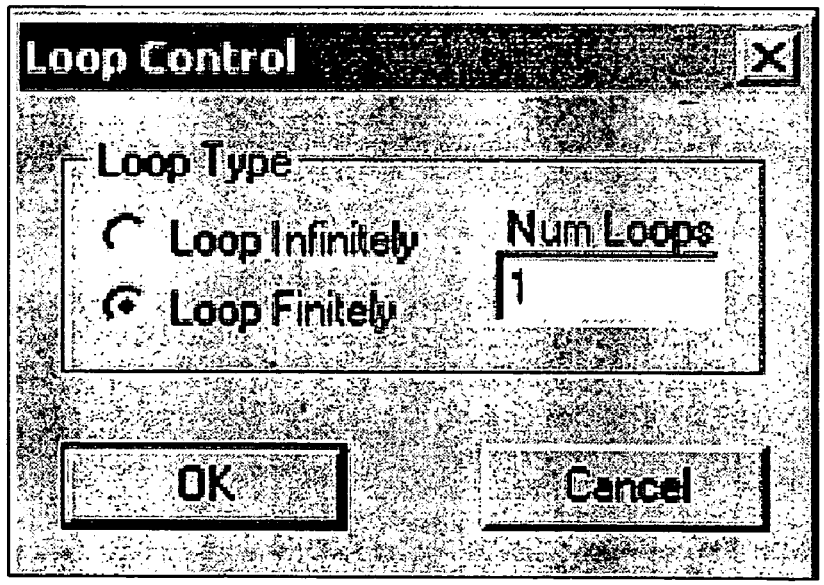
FIG. 3K6

*300* 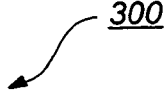

☐ See "New" under the "File" menu.

📂 See "Open" under the "File" menu.

📂 See "Load Interface Control Document (ICD) File..." under the "File" menu.

💾 See "Save" under the "File" menu.

✂ See "Cut" under the "Edit" menu.

📋 See "Copy" under the "Edit" menu.

📋 See "Paste" under the "Edit" menu.

⌐ See "Component Configuration" menu option under the "Control" menu above.

▶ See "Sequences..." option under the "Sequence" menu above.

🔘 See "Message Log..." option under the "Log" menu above.

Ⓢ See "Status View to Top" menu option under the "Control" menu above.

Ⓟ See "Predefined Messages View to Top" menu option under the "Control" menu above.

■ See "Message Window Control" menu option under the "Control" menu above.

❓ See "Help Topics" menu option under the "Help" menu above.

❓ Context Sensitive Help: After clicking on this icon, the user can retrieve help documentation on a particular window or widget anywhere in the Emulator application by clicking on the window or widget.

"Msg" Combo Box: This combo box contains identifiers for all message views currently displayed in the application. Selecting an entry in this combo box restores a message view if it is minimized and brings it to the top of the z-order.

"Predef" Combo Box: This combo box contains identifiers for all the pre-defined messages for the outgoing message whose view was most recently in focus. Selecting an entry in this combo box moves the pre-defined message identified by the selection to the appropriate Outgoing Message View. This action is functionally equivalent to clicking the "Move" button in the Predefined Outgoing Messages View.

☐ See "New" under the "File" menu.

📂 See "Open" under the "File" menu.

💾 See "Save" under the "File" menu.

✂ See "Cut" under the "Edit" menu.

📋 See "Copy" under the "Edit" menu.

📋 See "Paste" under the "Edit" menu.

❓ See "Help Topics" menu option under the "Help" menu above.

*FIG. 5*

UNIVERSAL SYSTEM COMPONENT EMULATOR WITH HUMAN READABLE OUTPUT

CROSS-REFERENCE TO RELATED APPLICATION

This application claims priority to U.S. Provisional Patent Application No. 60/389,557, filed Jun. 18, 2002, now abandoned, which is incorporated herein by reference.

REFERENCE TO COMPACT DISK(S) HAVING A COMPUTER PROGRAM

This disclosure includes a software appendix on a compact disk (in duplicate labeled COPY 1 and COPY 2), the entirety of which is copyrighted. The copyright owner has no objection to the facsimile reproduction by anyone of the patent disclosure as it appears in the U.S. Patent and Trademark Office patent files or records, but otherwise reserves all copyright rights whatsoever. An appendix, attached hereto, describes the contents of the compact disk by filename, size, creation date and description. All of the material on the enclosed compact disks is incorporated herein by reference in its entirety.

This disclosure includes a software appendix of 1,679 pages, the entirety of which is copyrighted. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

This invention relates to software development tools, particularly to software tools that support the development, test, and integration of digital system components that communicate with each other over a data bus.

2. Background of the Invention

In a network of distributed components, wherein data is transmitted between them during operation, testing of individual components requires a simulation/stimulation of the component under testing to evaluate its operation. The traditional challenges of test and integration of such system components are well understood, and include the limited test functionality of the actual system and components thereof, parallel development of several components requiring parallel testing, and design performance standards that predicate that the components under testing achieve a certain level of qualification before integrating it with other components. These conditions necessitate the use of test equipment that can somehow temporarily replace, or "emulate" the system environment so that components under test can be properly evaluated. Traditionally, engineers have resorted to two solutions to these problems: either a bus analyzer that permits monitoring of actual machine-formatted data transmitted in the system or an emulator that translates such data for a user while testing.

Bus analyzers can monitor and display raw data that has been transmitted over a network data bus (for example, Ethernet TCP/IP, or MIL-STD-1553) between system components. These applications also typically enable the user to define message data and transmit that data to a system component, thus acting as a rudimentary system component emulator, without the human-readable features.

When viewing or defining message data with a bus analyzer, the test engineer must decode or encode the message data himself/herself, as bus analyzers display data in "raw" format (usually hexadecimal). To do this, the engineer looks up the message type in question in the documented interface specification, and manually, using a scientific calculator or his own mind, encodes or decodes the raw message data. Generally, an engineer will expend much of his/her test and integration activity performing this encoding and decoding process. Unfortunately, the bus analyzer cannot decode the raw data into something meaningful for the user, because the bus analyzer has no knowledge of the interface specification.

An alternative solution for testing is a System Component Emulator (SCE). For this solution, an engineer will develop a software application which will "emulate" a particular system component. This means that the SCE will encode messages to, and decode messages from, the component under testing automatically in a manner exactly consistent with the requirements specification Oust as the component the SCE emulates would). As a consequence, the SCE can then represent the message data in a meaningful, human-readable format to the user. The SCE, therefore, automates the encoding and decoding of message data that the engineer would otherwise do manually with a bus monitor.

Also, an engineer may develop a complementary application that acts as a human-readable bus monitor, rather than a human-readable emulator. That is, rather than replace a system component, the application monitors the data messages passed between components, and displays them in a human-readable format. Software engineers must develop a human-readable emulator or monitor by writing the message encoding and decoding algorithms with respect to documented interface requirements. The resulting software application emulates or monitors one system component.

Compared to the bus analyzer, an SCE provides an advantage to the user by performing the encoding and decoding of the message data automatically. This enables the user to always deal with the message data in a meaningful, human-readable way, saving the engineer the time and effort it takes to encode and decode message data manually (i.e. "in his/her own head") with established interface specifications.

However, an SCE exhibits some disadvantages compared to a bus analyzer. First, an engineer or team of engineers must develop it from scratch, rather than simply purchasing an off-the-shelf bus analyzer. These development efforts consume money and valuable man-hours that managers would otherwise allocate to other engineering and development activities. Second, and more importantly, engineers typically develop SCEs to only emulate one system component, whereas a bus analyzer can mimic any system component. This means they have to repeat this development effort for every system component they need to emulate. Third, if the interface specification changes, this means expending more man-hours making corresponding changes to the SCE on top of the man-hours it takes to make the changes to the components in the system and the component under test (CUT).

A bus analyzer forces the tester to engage in the manual, time-consuming process of encoding and decoding message data that passes between the CUT and the rest of the system. However, after the organization purchases one, no time and money are involved. On the other hand, a SCE encodes and decodes message data automatically for the user, but can only be used as an emulator of one component, and takes a significant investment of time and money to develop and maintain.

There is a need, therefor, for an improved device which can emulate a variety of components, monitor, display and define their communications in human readable form, record communications, and automate communications without requiring human intervention.

SUMMARY OF THE INVENTION

In one embodiment, the emulator of the subject disclosure provides human-readable emulation capability for any system component or set of components. The emulator can emulate, in a human-readable fashion, one or more components in a system of components that communicate over any data bus protocol. To accomplish this, the emulator reads an ICD file structured in a machine-readable format that defines how to encode and decode messages passed to and from the connected component or components in question. When loading the ICD file, the emulator first determines the protocol the ICD file identifies. Then the emulator determines the system components that the ICD file defines and creates internal data objects that represent these components. Next, the Emulator determines the messages that exist in the ICD file, and creates internal data objects that represent these messages. By inspecting the route of each message identified in the ICD file, the emulator associates a copy of each message with the components identified by the route. The internal message objects are then populated with data objects representing message elements defined in the ICD file. These message elements are either fields or sets of fields. Each field in the ICD file defines a field's location in the raw message data (byte offset, bit offset), bit length, data type, least significant bit value (if applicable), enumerations (if applicable), and other field-related information. The emulator creates internal field objects that reflect the fields in the ICD file, and associates these internal field objects with the appropriate message or message element. This field information enables the emulator to extract field data from a received message and display the field data in a human readable format. Likewise, human-readable field data can be packed into the appropriate slice of an outgoing message.

In another embodiment, the emulator provides a human-readable monitoring capability for any set of two or more system components. The emulator accomplishes this feat in a manner similar to the above disclosed emulation capability.

In another embodiment, the emulator currently supports multiple communication protocols, including MIL-STD-1553B, Internet Protocol (IP), including both Transmission Control Protocol (TCP) and User Datagram Protocol (UDP), and the COM (otherwise known as serial or RS-232) port standard. ARINC 429, a commercial aircraft protocol, may be supported in the future as well as any other protocol now known or later invented as would be appreciated by those of ordinary skill in the pertinent art.

In another embodiment, the emulator displays the content of the last message of each incoming message type in a human-readable format. The emulator can display multiple instances of an incoming message type.

In another embodiment, the emulator enables the user to define the content of an outgoing message in a human-readable format. The user may send this message at any time.

In another embodiment, the emulator enables the user to define an unlimited set of "predefined" outgoing messages for each outgoing message type, and can send any one of these messages at any time in a point-and-click fashion. The user defines the content of the message fields in a human-readable format.

In another embodiment, the emulator can log, or "record," incoming and outgoing messages for display and for saving to a text file. The emulator displays and saves these messages in a human-readable, decoded format, similar to how it displays current incoming and outgoing messages.

In another embodiment, the emulator enables the user to define sequences of outgoing messages. The user defines the content of the message fields in a human-readable format, and can command a sequence to play from any point, pause, and stop execution. An unlimited number of sequences can play simultaneously.

In another embodiment, the emulator can interface with external executable objects written by other developers. Through these external executable objects, other developers can "automate" the behavior of a particular emulation.

In another embodiment, the emulator enables the user to save the path of the ICD file, the content of the ICD file, the positions of all the message windows, all the currently defined message sequences, all predefined outgoing messages, and other data the user has defined, in a file. The emulator can later read the stored information and restore the same emulation configuration, saving the user the time it would take to reconfigure the emulator manually (to reposition the windows, to redefine the message sequences, and the like). The emulator will append the extension ".mii" to the files which store the information.

In another embodiment, the emulator provides the capability to resolve inconsistencies between the data stored in a .mii file and changes made to the associated ICD file.

In another embodiment, the emulator enables the user to define the content of a message via a string of raw data read from a file. The user can also define a sequence of messages via strings of raw data copied from the clipboard or read from a file. The raw data may be defined in several formats, including but not limited to hexadecimal, octal, and binary.

In another embodiment, the emulator is able to create a sequence of messages automatically from the contents of a message log. The user will also be informed if the value he/she set in an outgoing message field is outside a range defined in the ICD.

In another embodiment, the emulator enables the user to set the content of an outgoing message by dragging and dropping messages from the Predefined Messages View to the appropriate Outgoing Message View and vice versa.

In another embodiment, the emulator enables the user to insert messages into a Sequence by dragging and dropping messages from the Predefined Messages View to the Sequence View.

In another embodiment, the emulator creates, updates and deletes databases containing the content of message logs, sequences, and other emulator structures. Preferably, this emulator also provides a user interface into said databases so that the user may view their contents and execute user-defined SQL commands on them.

In another embodiment, the emulator has the ability to save message logs, sequences, and other emulator structures to a file in XML format, and the ability to apply "stylesheets" (like XSL) to these files for easy display in a web browser.

In another embodiment, the emulator has the ability to apply stylesheets (like XSL) to an ICD for easy display in a web browser.

In another embodiment, the emulator enables the user to choose which fields in a message to show and which ones to hide.

In another embodiment, the ICD Editor application supports the emulator by providing the user with the ability to create and edit ICD files without concern for formatting considerations.

It would be desirable to provide an emulator with the capability to act as a human-readable bus monitor. That is, rather than emulate a particular component, a preferred embodiment can "listen in" to the communications between "real" system components, and decode the message data passed between them using the ICD file, and display the message data in a human-readable format.

It would be desirable to provide a user with the ability to record incoming, outgoing, or monitored messages exchanged between an environment and an emulator, display this recording to the user, and save this recording to a file while concurrently displaying these recordings in human-readable format. Further, it would be desirable to enable a user to define a sequence of outgoing messages that the user can play from any point in a sequence, pause, or stop at any time wherein the user defines the content of these messages in a human-readable format.

It would also be desirable to provide software developers with the ability to develop executable modules called "Behavior Objects." The user can "plug in" these behavior objects using the teaching of the subject disclosure to implement behavior that corresponds with how the emulated component would behave under similar circumstances. Preferably, a Behavior Object consists of a dynamically linked library (DLL) that implements an initialize function, a configure function and a terminate function. The emulator calls the initialize function when the user elects to load the Behavior Object. The user can then tell the emulator to call the Behavior Object's configure function, which may then perform configuration operations (for example, display a dialog that enables the user to modify the Behavior Object's behavior, or read configuration data from a file). During the execution of either the initialization or the configure function, the Behavior Object must register with the emulator any events internal to the emulator that the Behavior Object wishes to be notified of, if any. These events include, but are not limited to, the reception or transmission of a message. Whenever such events occur inside the emulator, and the Behavior Object has registered to be notified of the event, the Behavior Object is notified immediately, and can then modify the behavior of the emulator accordingly. For instance, perhaps the content of an incoming message should change the content of an outgoing message. To implement this behavior, the Behavior Object, during the initialize or configure functions, would register with the emulator to be notified of the reception of the incoming message. Upon such notification, the Behavior Object can examine the content of the incoming message and modify the content of the outgoing message accordingly. Upon user request or termination of the emulator application, the Emulator calls the Behavior Object's terminate function. This function unregisters all the event notifications registered during initialize and/or configure. The emulator can have several Behavior Objects loaded and operating at one time, limited only be computing resources (RAM for example). Each of the several Behavior Objects may register for the same emulator events and be notified accordingly.

It should be appreciated that the present invention can be implemented and utilized in numerous ways, including without limitation as a process, an apparatus, a system, a device and a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosure appertains will more readily understand how to make and use the same, reference may be had to the drawings wherein:

FIG. 4 illustrates emulator toolbar icons constructed in accordance with the subject disclosure.

FIG. 5 illustrates the ICD editor icons constructed in accordance with the subject disclosure.

DETAILED DESCRIPTION OF THE PREFERRED EMBODIMENTS

Figure 1:
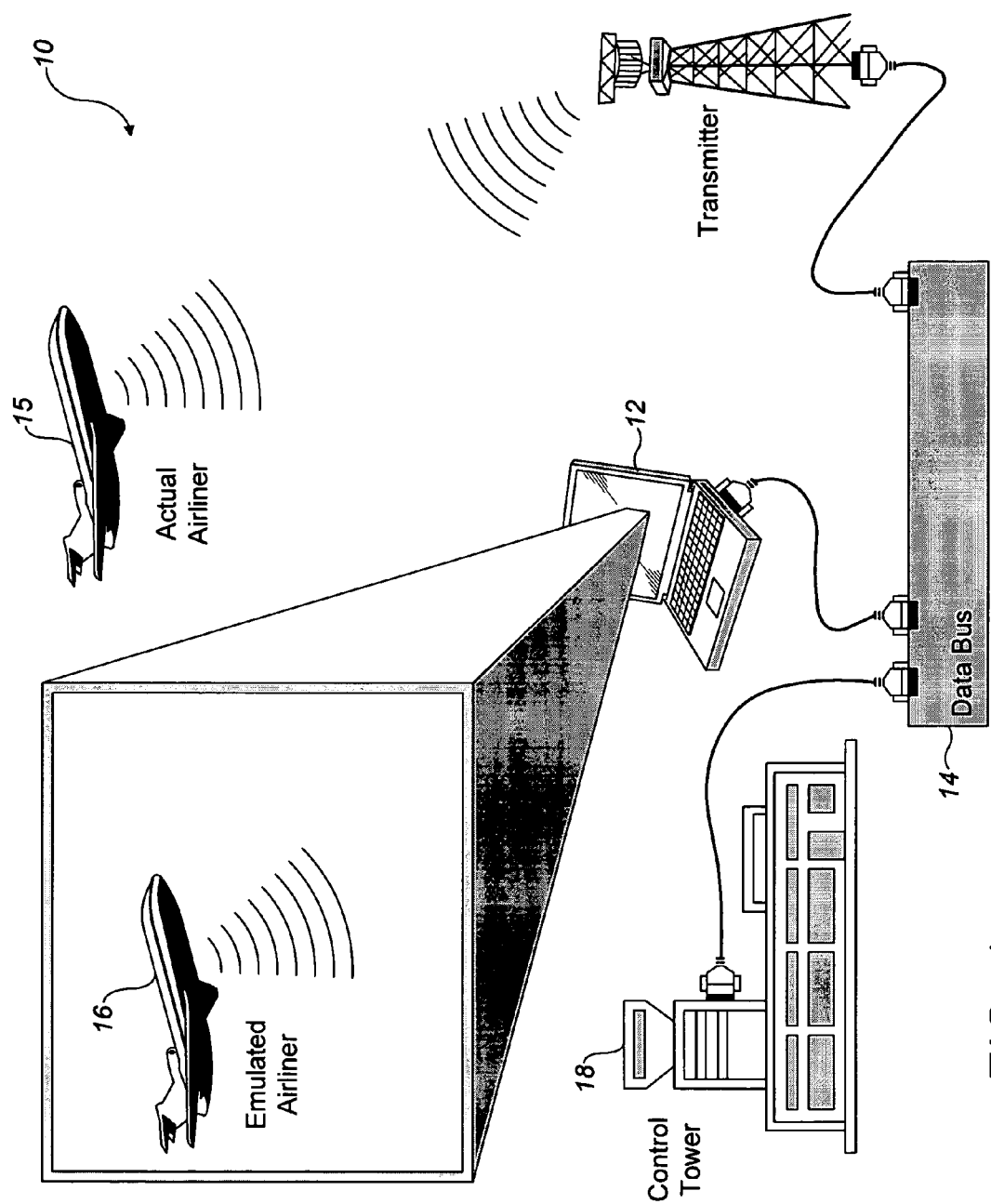
FIG. 1 shows an overview of an example environment in which an emulator constructed in accordance with the subject disclosure may be used.

The following definitions, whether appearing in lower case or with capitalizations, are used throughout the specification to describe the preferred embodiments:

System: A collection of components that communicate with each other over a data bus.

System Component (or "Component"): A computer or other digital device that communicates with other components over a data bus.

IC (Interface Control Document): A document that describes how information is encoded in data messages passed between components of a system, encompassing interface requirements between two or more components in a system.

CUT (Component Under Test): A component currently undergoing testing.

CC (Connected Component): A system component that communicates with the CUT.

SCE (System Component Emulator): A software application or digital device developed specifically to replace, or "emulate," a particular CC in order to aid development, test, and/or integration of the CUT. This means that a SCE encodes and decodes message data in exactly the same way as the CC replaced thereby. Stated another way, the SCE communicates with the CUT in a way that is compliant with the ICD between the CUT and the CC. Therefore, when a SCE is developed correctly, the CUT cannot "tell the difference" between the SCE and the CC. A SCE typically enables test engineers to conveniently test the CUT.

Human-Readable Universal System Component Emulator (or "Emulator"): The preferred emulator can appropriately be described as a "Human Readable, Universal System Component Emulator." Like a SCE, the emulator serves as a test tool that encodes and decodes message data automatically for the user in a manner compliant with an ICD. However, unlike a SCE, the emulator can be configured to encode and decode message data for any given ICD. The emulator accomplishes this by reading an ICD file and configuring itself accordingly. By contrast, a SCE normally encodes and decodes message data according to only one ICD.

Message: A string of digital data transmitted from one system component to another over a data bus. Both components must encode and decode messages in a manner that complies with an ICD.

Message Type: A digital format detailing how to encode and decode message data for a particular message. An ICD defines a set of message types.

Message Element: General term that denotes either a Field, Repeater, Structure or Pivot Structure (as defined herein). An ICD declares message elements.

Raw Message Data (or just "Raw Data"): Encoded message data transmitted across a data bus. SCEs and a preferred emulator encode human-readable data into raw data before transmission. Likewise, SCEs an a preferred emulator decode received raw data and display the raw data in human-readable format.

Pointer: A term denoting when a message element refers to another message element in an ICD. For example, the repeater in the example's "Nearby Aircraft Info" message refers, or "points to" the "Nearby Aircraft Info Struct" Structure (this is the message element that the repeater repeats).

Message Field (or just "Field"): A message element that represents a single data item inside a message. For example, the "Heading" field in the Aircraft Status message in the Tower and Airliner example specified below.

Field Type: An ICD assigns each message field with a "field type." A field type defines how the receiving system component should interpret the bits of data in the field. The emulator preferably supports the following field types: Signed and unsigned integers of any size between 1-64 bits; Enumerations or enumerated fields associate an integer with an ICD-defined textual description of it's meaning (For example, our example's "Destination Info" message enumerates the "Wind Direction" as NORTH, SOUTH, EAST, etc. NORTH=0, SOUTH=1, EAST=2, etc. Since enumerated fields are transmitted as integers, they can have any size between 1 and 64 bits.); ASCII String (text) of any length; Boolean (TRUE or FALSE, always 1 bit in length); Float (32-bit IEEE floating point format); Double (64-bit IEEE floating point format); Real or real fields are integers associated with a real number "least significant bit" (LSB) value. That is, if a real field's value is 10.5, and its LSB is 0.5, it will be transmitted as an integer value of 21 (hexadecimal: 0x15); and Hexadecimal of any length.

Structure (or just "Struct"): A message element that defines a set of ordered Fields, Repeater Fields, pointers to Structure Groups, and/or pointers to other Structures defined in the ICD. The ability to define Structures in the ICD enables the user editing the ICD to define a set of message elements that occur several times in the ICD only once. Each time a structure occurs, the ICD simply "points," or refers, back to the Structure already defined. As indicated above, Structures can contain, or point back to, other structures. An example of a structure element occurs in the Tower and Airliner example ICD, defined below. This ICD defines the "Geo-location" structure, which contains "Latitude," "Longitude," and "Altitude" fields. This structure occurs in the "Aircraft Status" message.

Pivot Element: A message element that will superimpose different structures over the same slice of a message's raw data, depending on the value of an associated "pivot field." For example, in the Tower and Airliner ICD, the "Aircraft Status" message contains a Pivot Element. If the message's "Aircraft Type" field has a value of "Commercial," the "Commercial" structure is superimposed on the Pivot Element's message slice. If the "Aircraft Type" field has a value of "Military," the "Military" structure is superimposed on the Pivot Element's message slice. If the "Aircraft Type" field has a value of "Private," the "Private" structure is superimposed on the Pivot Element's message slice. Note that each of these structures superimpose a different set of fields on the same slice of a message's raw data. In an Outgoing Message View, when the user selects a new value in a pivot field, the Fields Grid is updated appropriately with the new fields. When an Incoming Message View receives an incoming message with a Pivot Element therein, the Fields Grid is also updated appropriately with the new fields.

Repeater: A message element that defines how many times a particular (other) message element repeats in a message. The repeat count is determined dynamically, while an emulation is running, with the value of an associated "count field" in the same message. In other words, the value of one field (the count field) determines how many times another message element repeats in a message. In the Tower and Airliner ICD, the "Nearby Aircraft Info Struct" Structure occurs in the "Nearby Aircraft Info" message. The "Aircraft Count" field in this message serves as the repeater's count field. The value indicated by the "Aircraft Count" field determines how many times the "Nearby Aircraft Info Struct" repeats in the message.

View and Dialog: Windows that appear in software applications running on any Windows operating system.

Predefined Outgoing Messages (or "Predefined Messages"): Outgoing messages that the user can define at any time in a human readable format. The emulator stores these messages so that the user can send the predefined messages at any time in a point-and-click fashion. This feature of the emulator enables the user to define an outgoing message only once and reuse the outgoing message over and over again.

Outgoing Message Sequence (or just "Sequence"): A user-defined sequence of outgoing messages that the user can play from any point, pause, or stop. The user defines these messages in a human-readable format, and can insert predefined messages into a sequence.

The present invention overcomes many of the prior art problems associated with bus analyzers and SCEs. The advantages, and other features of the system disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

The present disclosure provides an emulator software application or emulator that can emulate, or "replace," any digital system component that communicates with one or more other system components over a data bus. More particularly, the currently preferred embodiment of the present invention is comprised of a MS Windows-based application that serves as a test tool that encodes and decodes message data automatically for the user in a manner compliant with an interface specification, thus permitting automatic configuration to encode and decode message data for any given component or set of components to be tested. The emulator is made up of numerous executable modules that all work together, as detailed below. In the future, other applications may utilize one or more of these executable modules. These applications will most definitely exhibit different features, functionality, look and feel, user interface, and method of operation than the preferred embodiment of the emulator. While this detailed description exhibits many aspects of the emulator, it should not be construed as limitations on the scope of the invention, but rather as exemplifications of preferred embodiments thereof. It is envisioned that the universal emulation may be achieved by computing platforms of a high variety of configuration as would be appreciated by one of ordinary skill in the pertinent art based upon review of the subject disclosure.

Referring to FIG. 1, a data environment 10 is shown in which the Human-Readable Universal System Component Emulator 12 of the subject disclosure operates. The data environment 10 is comprised of a plurality of discrete software components that communicate with each other over a data bus 14. For example, a simple, two-component avionics system is shown that is designed to enable an airliner 15 and the airliner destination's air traffic control tower 18 to communicate with one another. Every second, the airliner 16 via a computer therein (not shown) transmits an Aircraft Status message comprised of the aircraft's current status (heading, airspeed, fuel status, etc.) to the control tower 18. A computer (not shown) in the control tower 18 displays the contents of the Aircraft Status Message to the air traffic controllers upon command. Periodically, the control tower 18 transmits a Destination Information message containing information about the destination airport (temperature, wind speed and direction, precipitation type, which of the multiple landing strips to land on, and the like) to the airliner 15. The airliner 15 then displays the contents of the Destination Information message to the pilots so the pilots can prepare appropriately for landing. Also, periodically, the control tower 18 transmits an Air Traffic message containing information about other nearby aircraft, including a nearby aircraft's ID and position. The pilots on the airliner 15 can monitor the contents of the Air Traffic message via the airliner's computer display. In this example, the messages are being transmitted via radio waves through the air. The emulator 12 of the subject disclosure is shown emulating the interface occurring between the airliner 16 and the control tower 18 for an emulated airliner 16.

Figure 2:
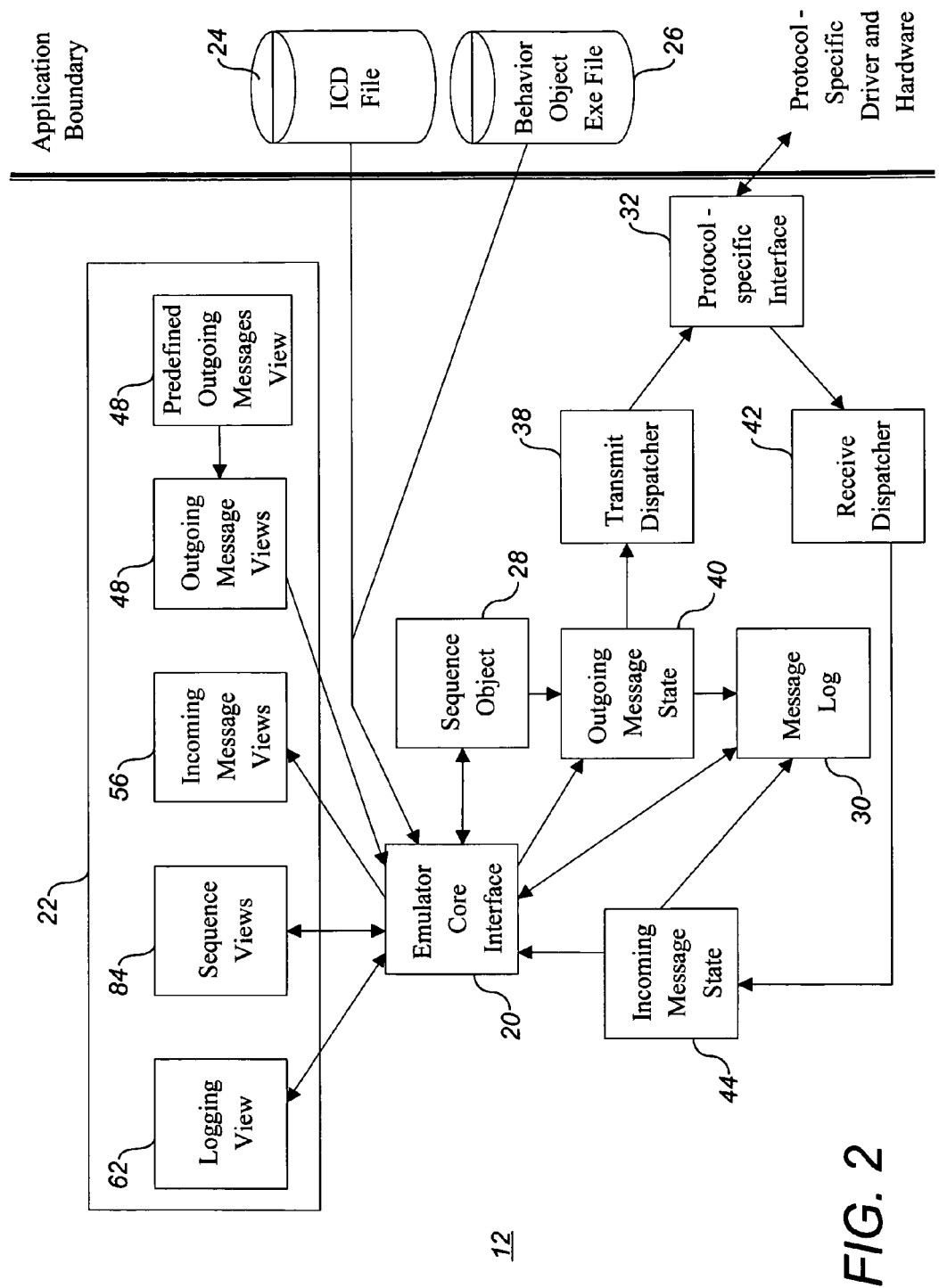
FIG. 2 is a functional diagrammatic representation of a computing platform configured as an emulator constructed in accordance with the subject disclosure.

FIG. 2 summarizes the primary objects and data flows in the emulator application to accomplish universal emulation. An Emulator Core Interface 20 provides an interface between a user interface 22 and the lower, functional levels of the emulator 12. The Emulator Core Interface 20 also accesses objects outside the emulator 12. For example, the emulator core interface 20 can read an ICD file 24 upon user command, and generate the appropriate message states in response. The emulator core interface 20 can also load a Behavior Object Dynamically Linked Library (DLL) file 26 upon user command and enable its execution.

A Sequence Object 28 receives commands and requests from the user interface via the Emulator Core Interface 20. Specifically, the sequence object 28 handles encoding the messages in the sequence, playing, pausing, and stopping an outgoing message sequence. A Message Log 30 also receives commands and requests from the user interface via the Emulator Core Interface 20. Specifically; the Message Log 30 records incoming and outgoing messages upon user command and decodes the recorded messages.

An outgoing message state 40 is in communication with the sequence object 28. The Outgoing Message State 40 encodes the human-readable field values into raw message data, and sends the message data to the Transmit Dispatcher 38. The Outgoing Message State 40 also logs the message if the user enabled logging for this message. Typically, the emulator application 12 will contain one of these message states for each outgoing message type defined in the ICD file 24. Within the user interface 22, the Predefined Outgoing Messages View 46 can copy a stored message to the appropriate Outgoing Message View 48. The User Interface 22 is also comprised of a plurality of function dialog boxes, windows, and views as further detailed below in FIGS. 3A-3P that permit the user to access and implement the functionality of the emulator 12.

In a preferred embodiment, an Incoming Message Views 56 with in the user interface 22 display the fields in incoming messages in a human-readable format. The Incoming Message Views 56 also display the raw data of incoming messages and a recording of the most recent messages. The Incoming Message Views 56 request incoming message data from the Emulator Core Interface 20. The Emulator Core Interface 20 passes these requests to the appropriate Incoming Message State 44. If the user has marked a particular Incoming Message State 44 for logging using the Logging View 62, the Incoming Message State 44 will send the message data to the Message Log 30 for recording purposes after receiving the message data from the Receive Dispatcher 42. The Receive Dispatcher 42 receives the message data from the Protocol-Specific Interface 32 which in turn is supplied the incoming message data from the Protocol-Specific Driver and hardware 34.

Similarly, the Outgoing Message Views 48 enable the user to define outgoing message data in a human-readable format. Like the Incoming Message Views 56, these objects also display the message's raw data and a recording of the most recent messages. These objects also display a "Send" button, so the user can send the message he defined on command. The Predefined Outgoing Message View 46 enables the user to define the content of numerous outgoing messages. The user can copy any of these messages to the appropriate Outgoing Message View 48 at any time. The Outgoing Message Views 48 send user commands and outgoing message data to the Emulator Core Interface 20. The Emulator Core Interface 20 passes these commands and data to the appropriate Outgoing Message State 40. If the user has marked a particular Outgoing Message State 40 for logging using the Logging View 62, the Outgoing Message State 40 will send the message data to the Message Log 30 for recording purposes before sending the message data to the Transmit Dispatcher 38. When the Transmit Dispatcher 38 receives message data from an Outgoing Message State 40, the Transmit Dispatcher 38 sends the message data to the Protocol-Specific Interface 32. The message data is subsequently directed to the Protocol-Specific Driver and hardware 34. How exactly the Transmit Dispatcher does this depends on the third party driver currently in use as would be appreciated by those of ordinary skill in the pertinent art.

The Logging View 62 enables the user to command the subject application to start and stop a log, choose which message types to log, set a limit on the number of messages or bytes to log, search a log for a particular field value or range of values, and save the log to a file. The Logging View 62 passes user commands and requests to the Emulator Core Interface 20, including when to start and stop logging, and which messages to log. The Logging View 62 also queries the Emulator Core Interface 20 for the logged data. The Emulator Core Interface 20 passes these commands and requests to the Message Log 30.

The Sequence View 84 enables the user to define a sequence of outgoing messages, and to play, pause, and stop the sequence. The Sequence View 84 passes user commands and requests to the Emulator Core Interface 20, including commands to start, pause, and stop the sequence, and create, edit and delete a sequence. The Emulator Core Interface 20 passes these commands and requests to the Sequence Object 28. While a Sequence Object 28 plays a scenario, the Sequence Object 28 outputs messages to the appropriate Outgoing Message States 40. From here, the Outgoing Message State 40 outputs the messages to the Transmit Dispatcher 38.

A Transmit Dispatcher 38 receives outgoing message data from all the Outgoing Message State objects 40 and sends the message data to the Protocol-Specific Interface 32. The Receive Dispatcher 42 receives incoming message data from the Protocol-Specific Interface 32 and determines the appropriate Incoming Message State 44 to send the incoming message to. The Protocol-Specific Interface 32 also sends and receives data to and from the Protocol Specific Driver 34 of the communication device currently in use on the computing platform. The Incoming Message State 44 receives message data from the Receive Dispatcher 42, which the incoming message state 44 then decodes, enabling the user interface 22 to access the value of the message fields through the Emulator Core Interface 20. The Incoming Message State 44 also logs the message if the user enabled logging for this message. Typically, the emulator 12 of the subject disclosure application will contain one of these message states for each incoming message type defined in the ICD file 24.

The ICD file 24 contains an emulator-readable ICD detailing the interface requirements between components in the system 10. The Emulator Core interface 20 reads this file upon user command. The Behavior Object Exe File 26 is an optional executable object that the user can "plug in" to the emulator 12 of the subject disclosure application. Developers create behavior objects to add extra behavior to an emulation provided by the emulator 12 of the subject disclosure. The behavior objects have access to all the core services that the user interface has access to. For example without limitation, behavior objects can read message data, modify message data, build sequences, start sequences, stop sequences, start log, and stop logs. The Protocol-Specific Driver 34 and associated hardware represents any third party drivers and interface devices that the emulator 12 may use to communicate with the protocol the ICD file 24 defines. The Protocol-Specific Interface 32 initializes the protocol-specific hardware and sends and receives message data to and from the Protocol Specific Driver 34 via Data Flow 36.

In another embodiment, the emulator can interface with external executable objects written by other developers. Through these external executable objects, other developers can "automate" the behavior of a particular emulation. For example, in the commercial aviation situation, if the control tower's computer changes the airstrip that the tower wants the airliner to land at, the airliner should change the heading it reports to the tower (because the airliner would have to "aim" for a new airstrip).

Figure 3A:
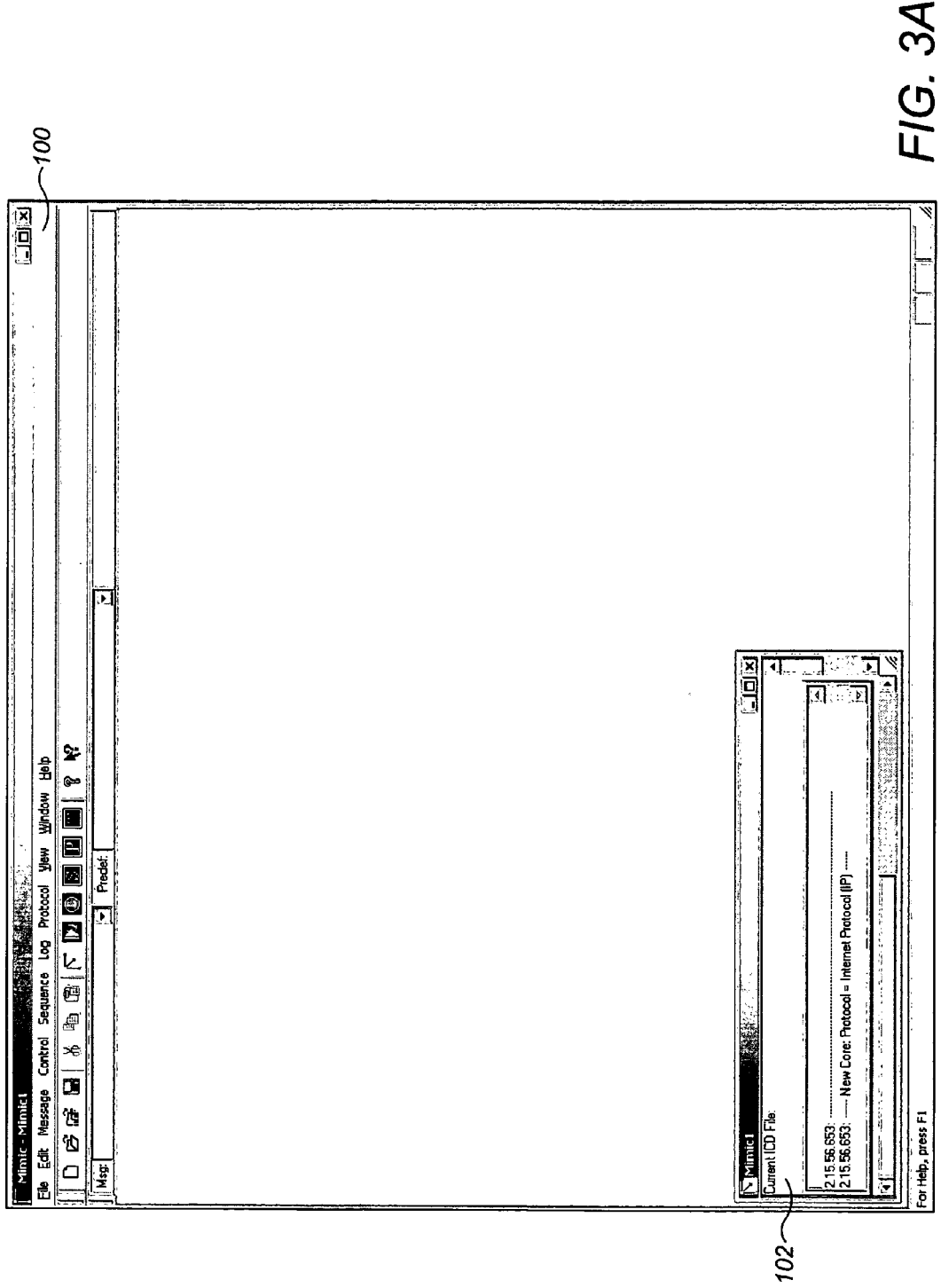
FIGS. 3A-3P are screen image captures showing representative views and dialog boxes illustrative of the operation of the emulator and ICD Editor as expressed in the detailed description of the preferred embodiment.
Figure 3C:
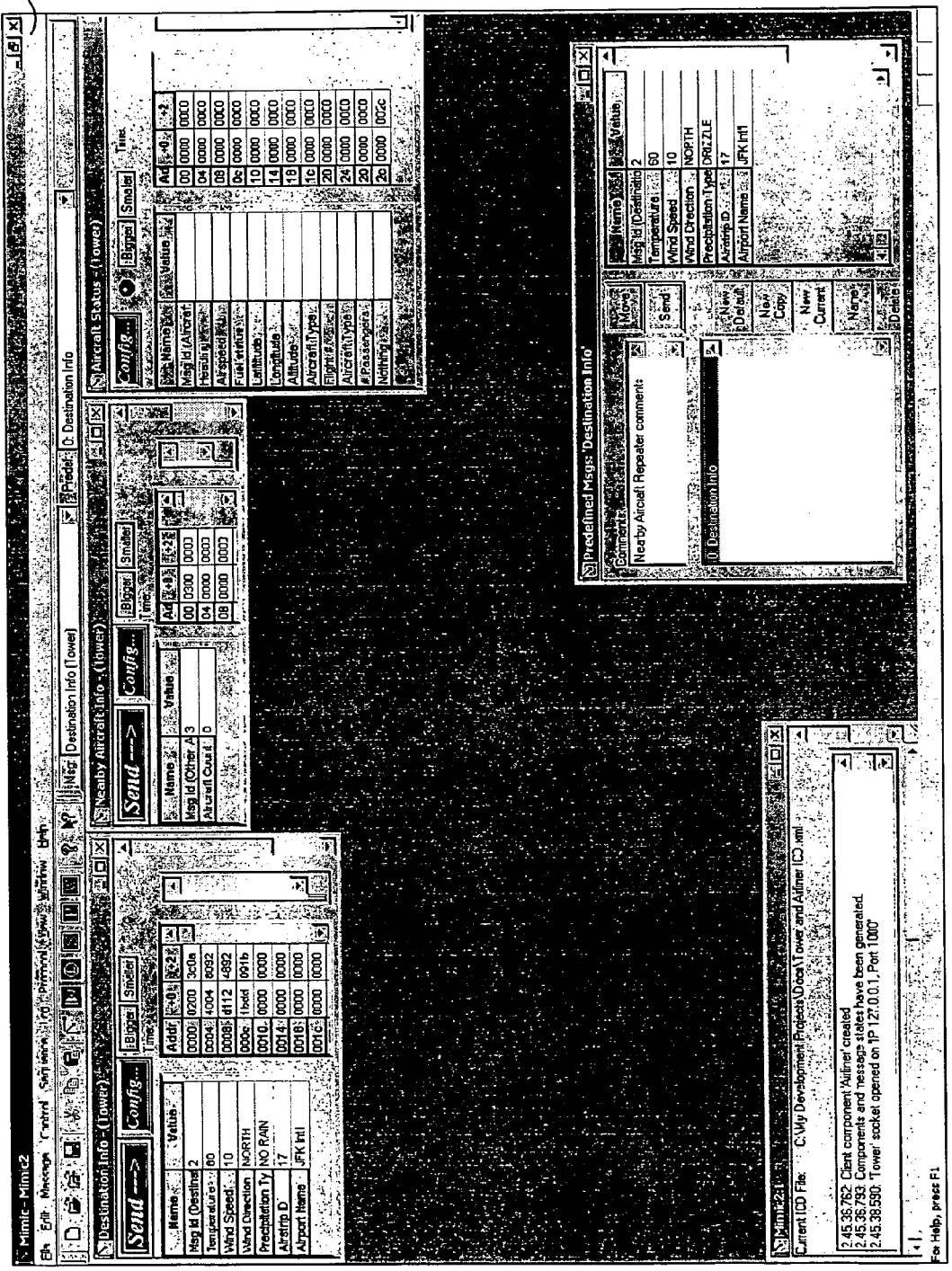
Figure 3D:
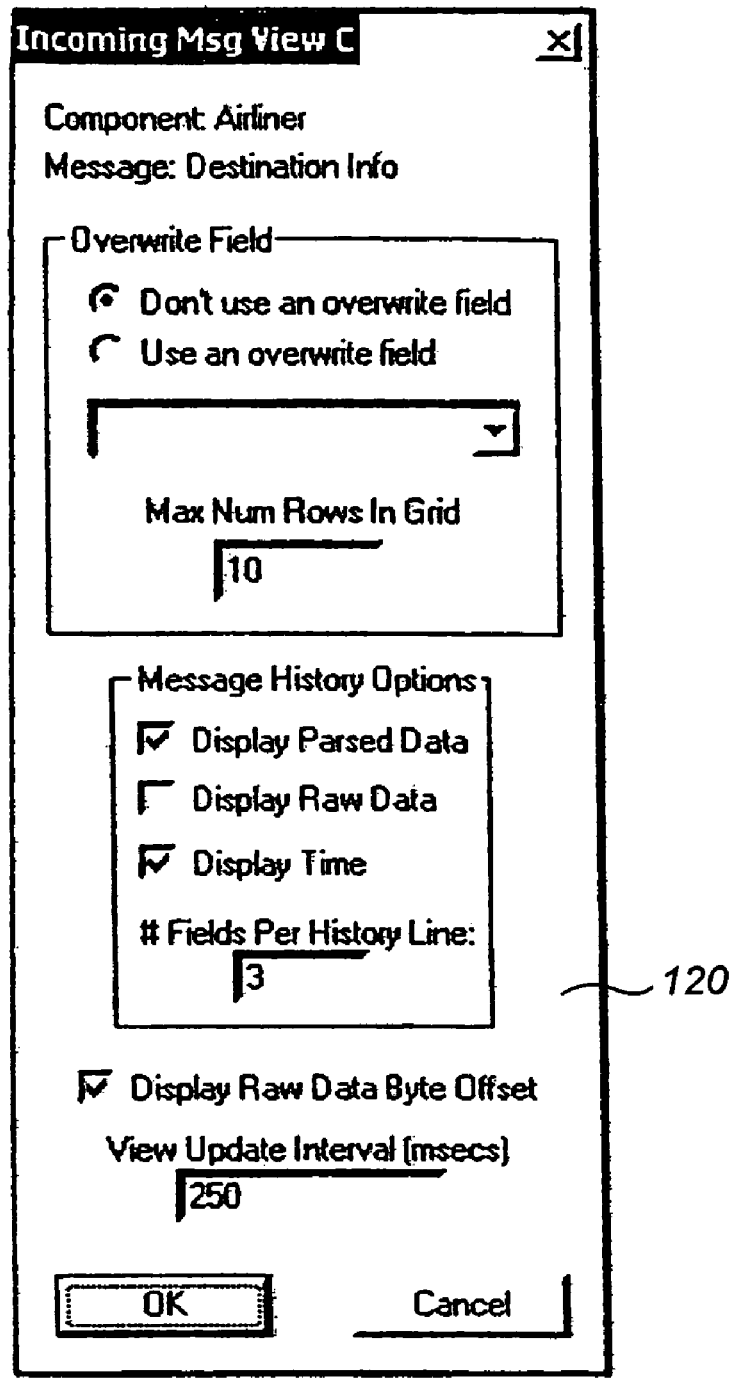
Figure 3E:
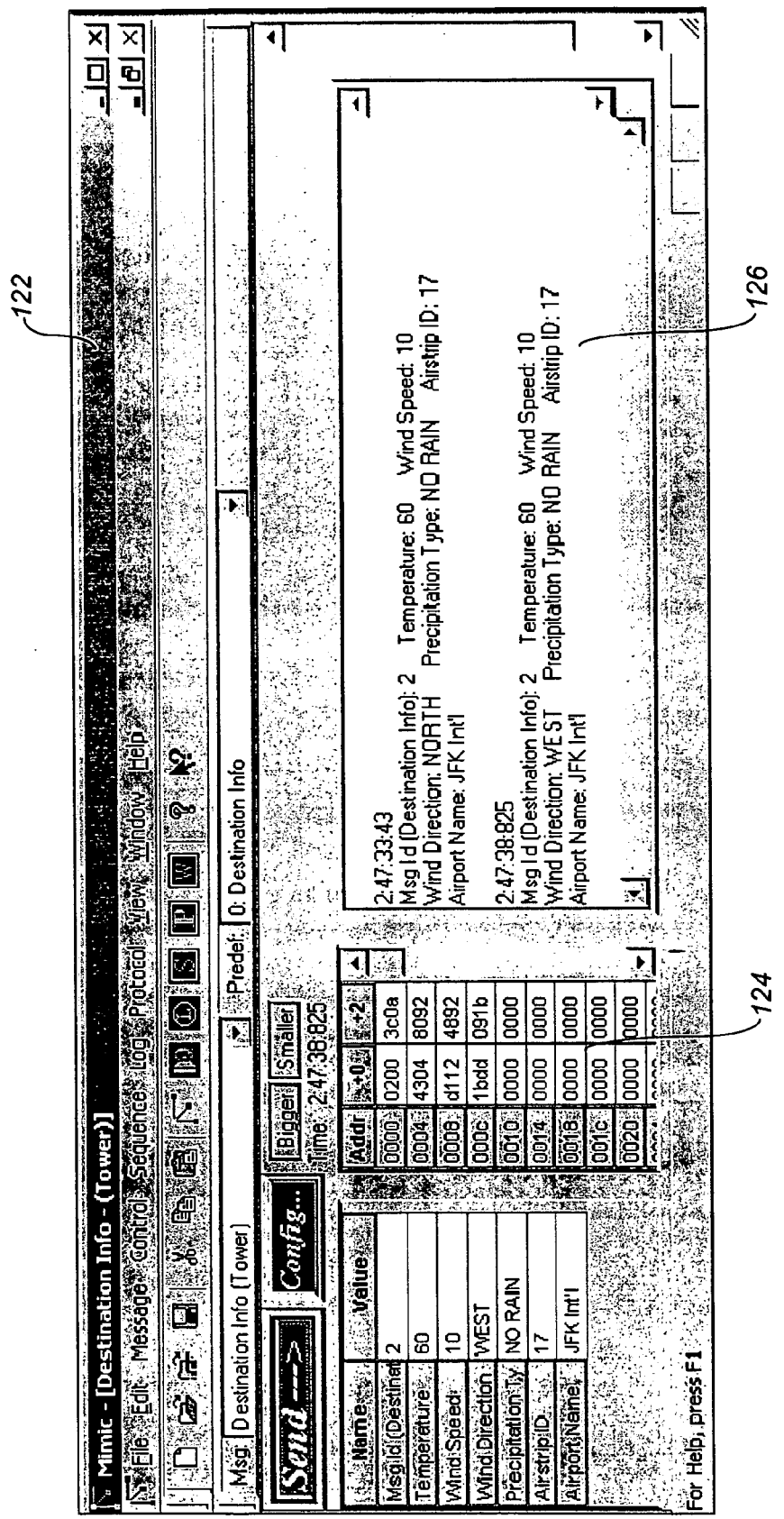
Figure 3H:
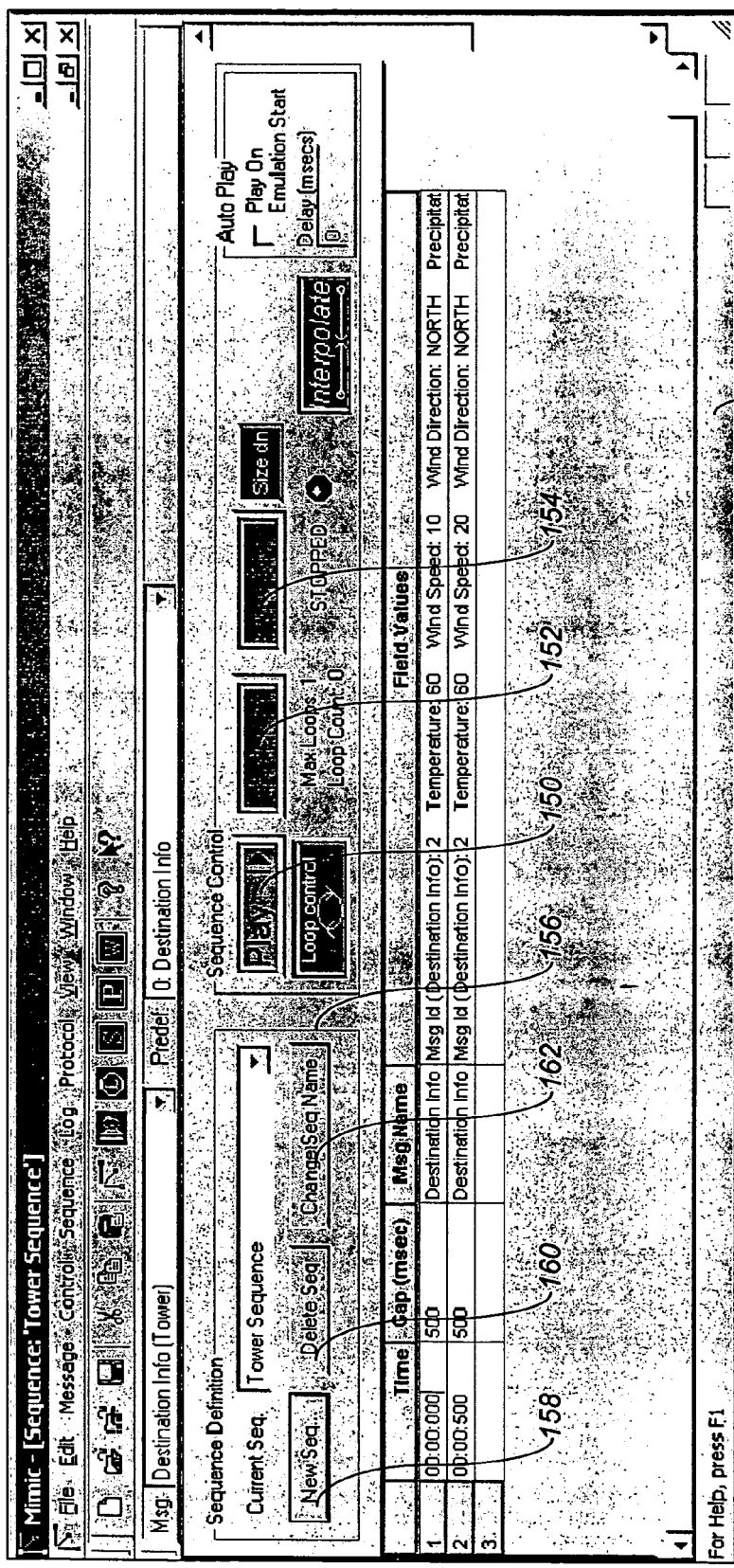
Figure 3I:
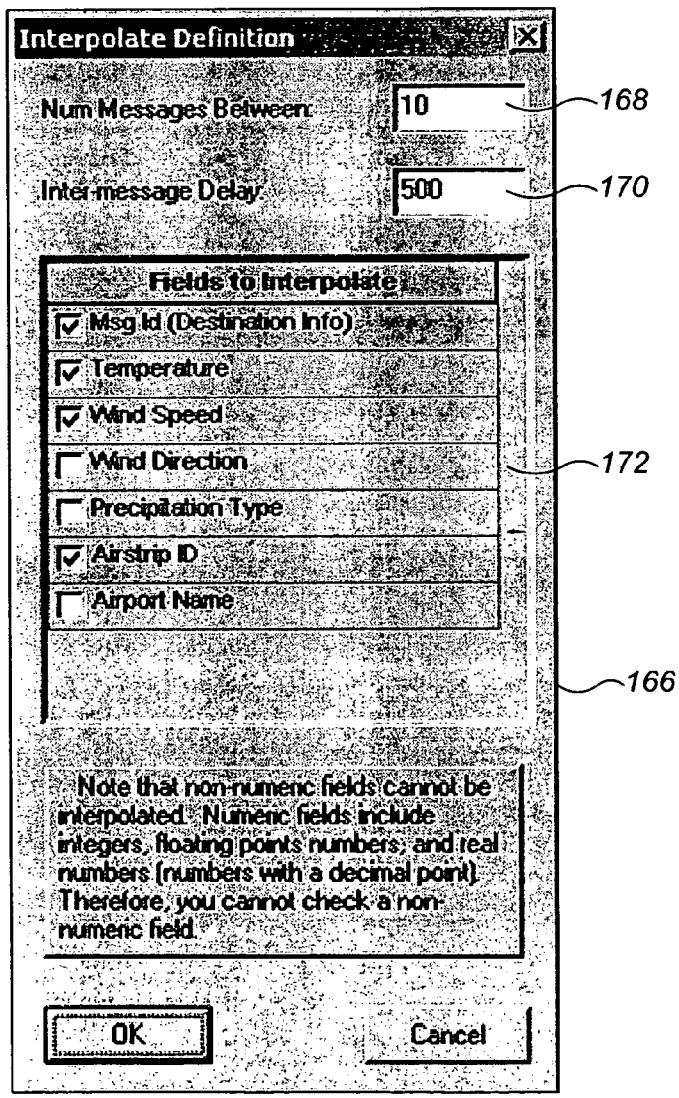
Figure 3J:
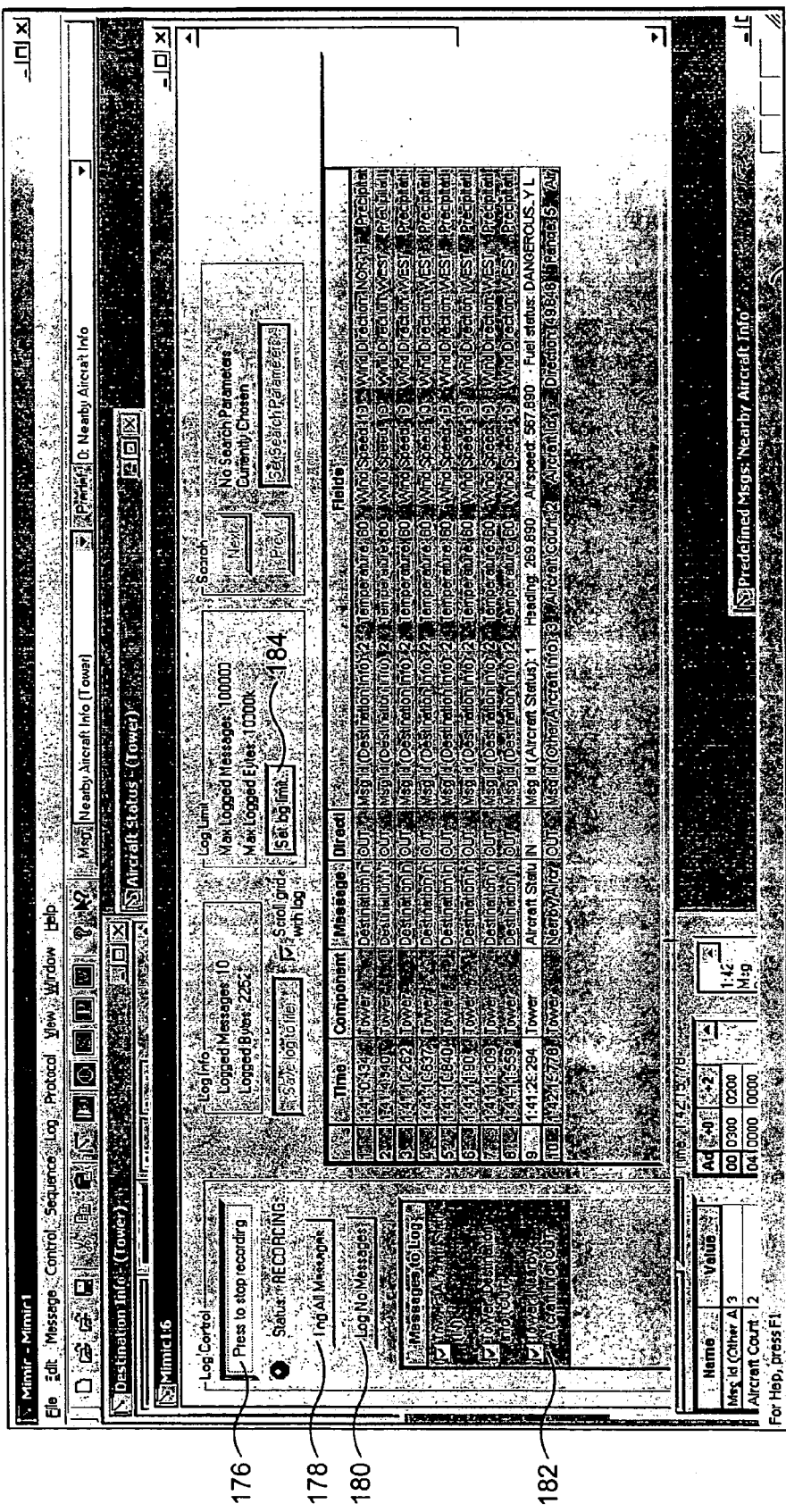
Figure 3K:
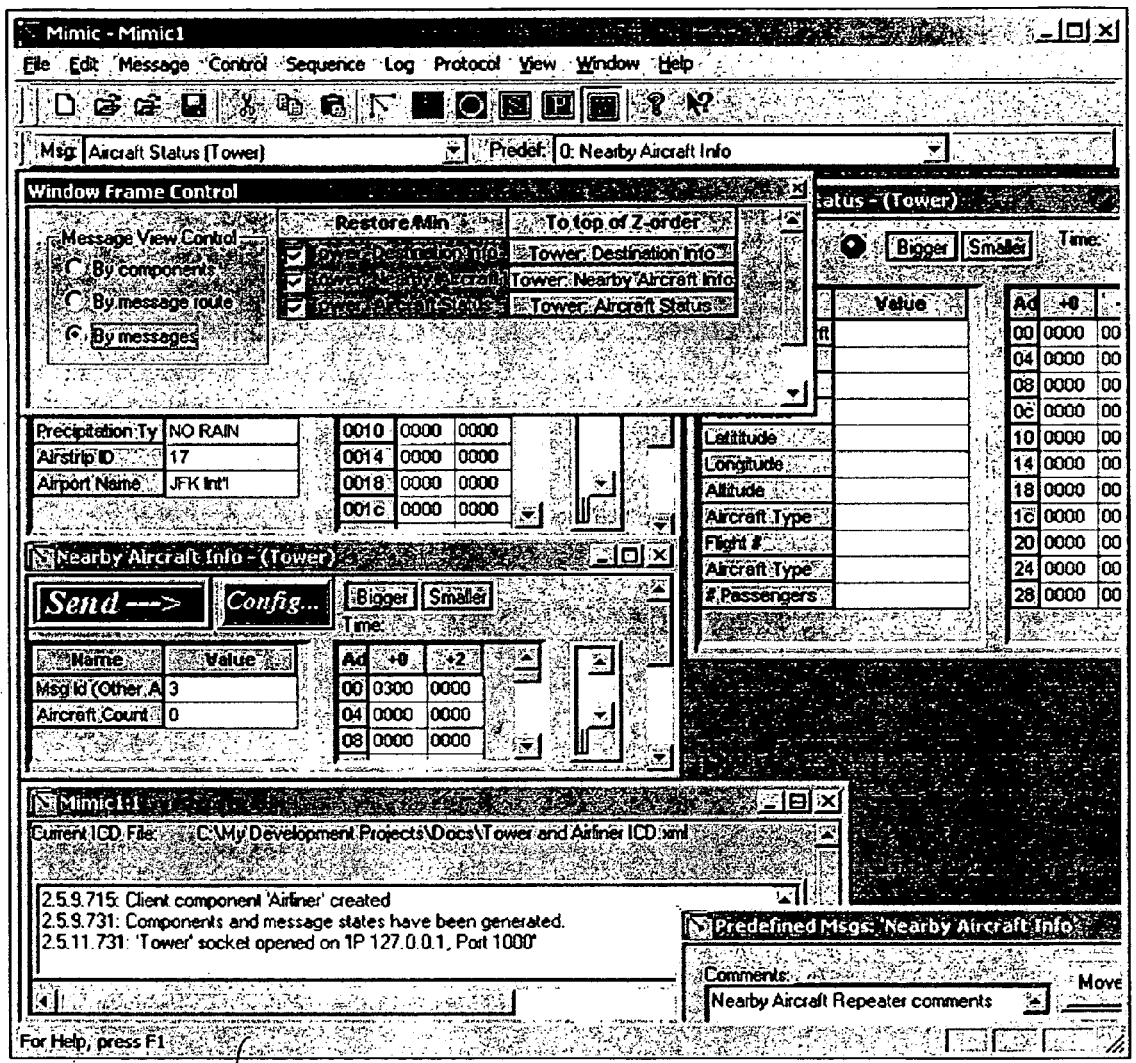
Figure 3L:
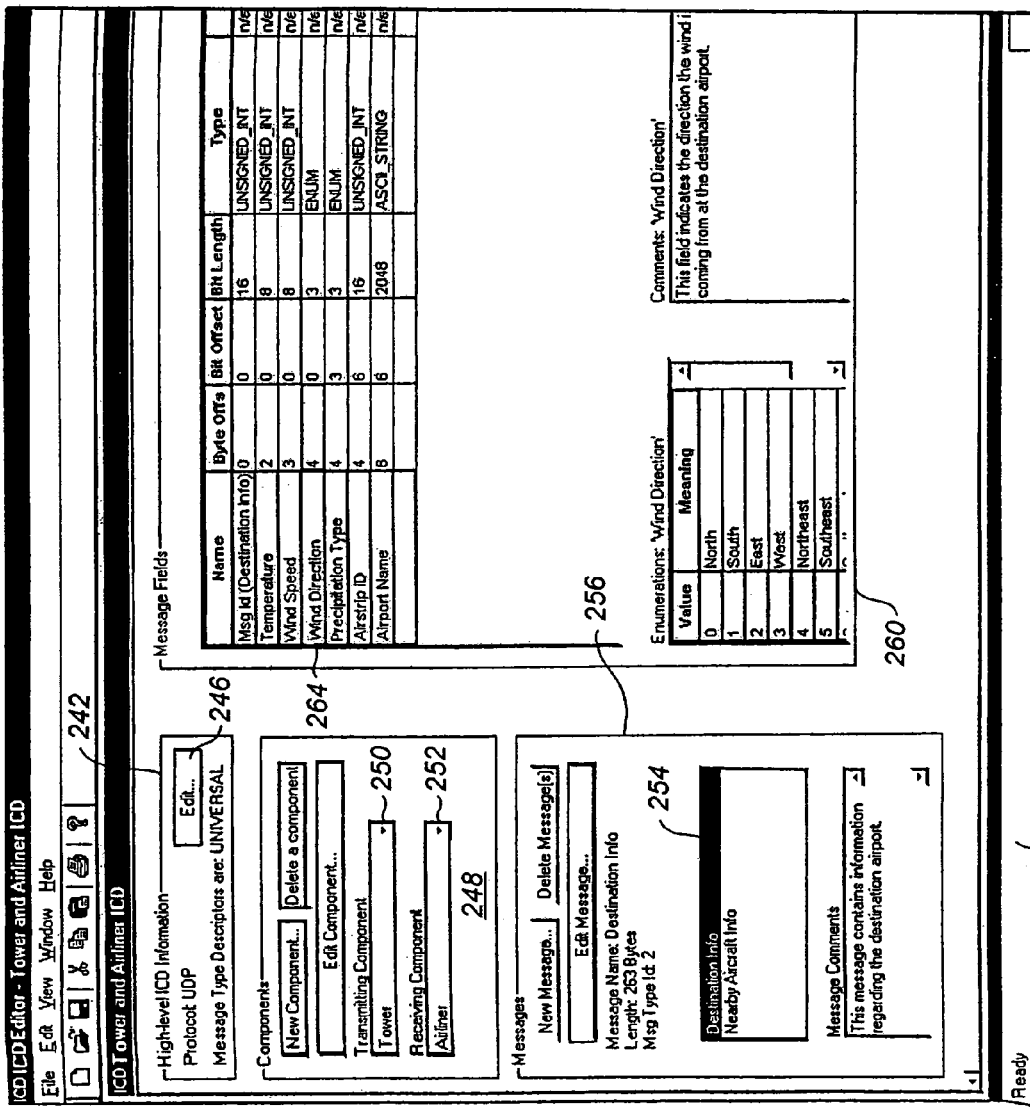
Figure 3M:
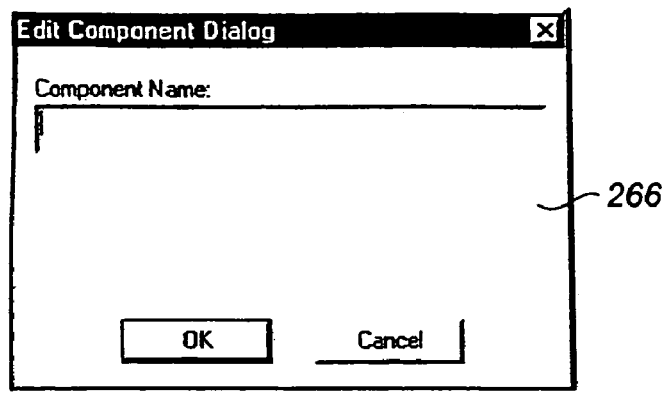
Figure 3N:
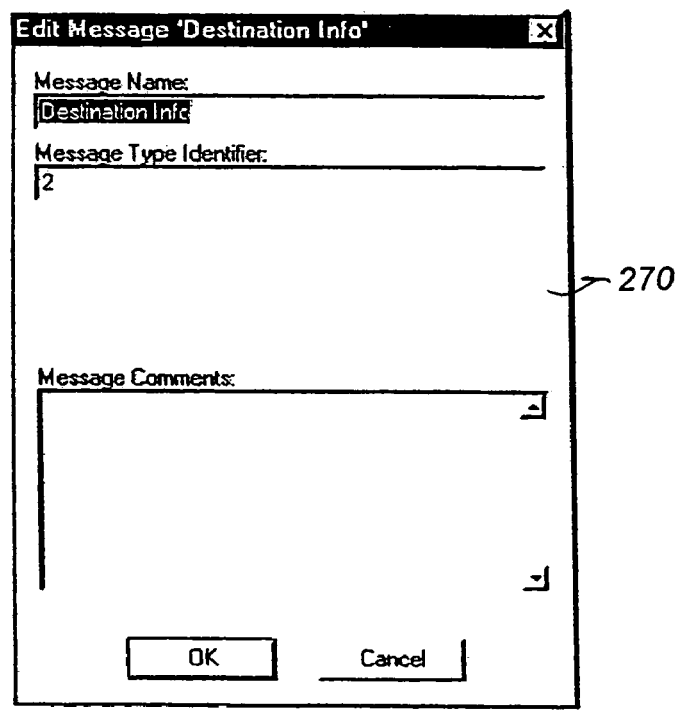
Figure 3O:
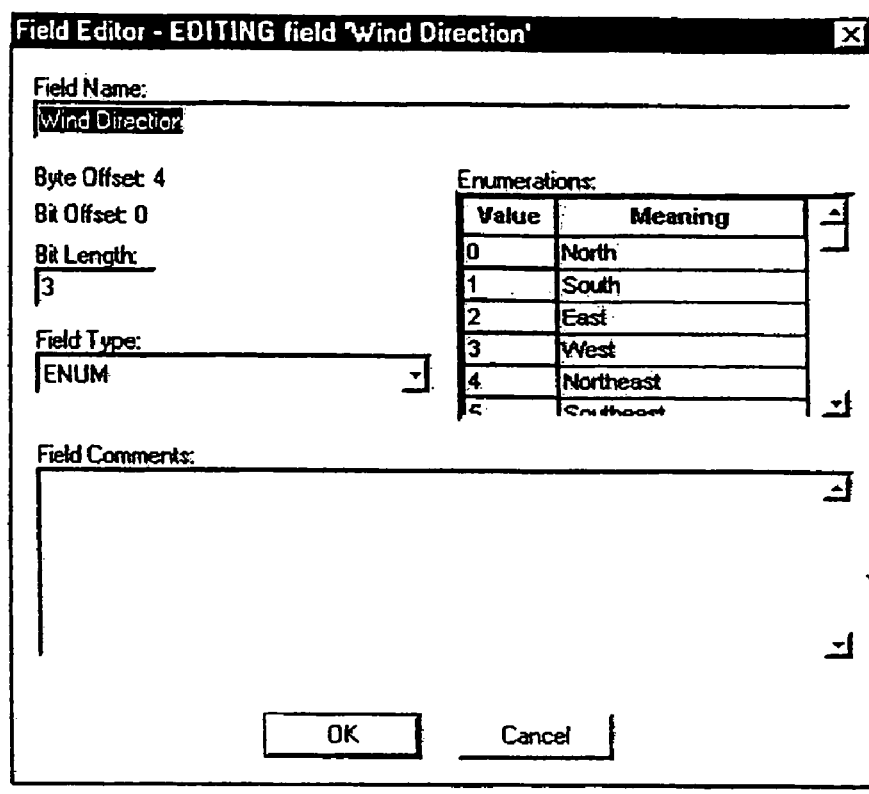
Figure 3P:
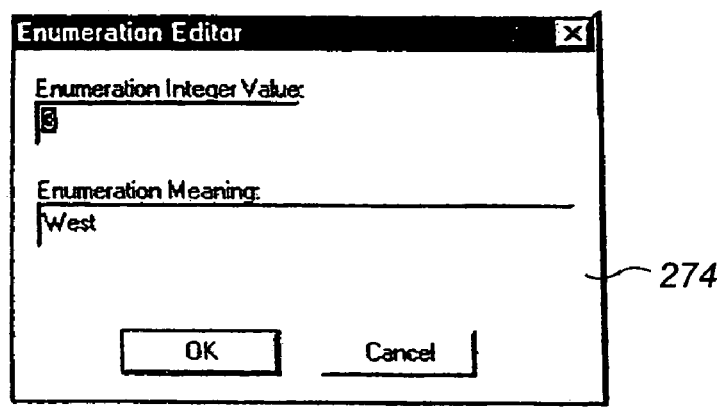

For the purposes of providing protocol-specific functions and features to the user, the subject disclosure details communication- and operating system-specific dialogs, views, and other user interfaces as shown in FIGS. 3A-3P. It is envisioned that universal emulation may be achieved by computing platforms of a high variety of hardware, software, and other technical configuration as would be appreciated by one of ordinary skill in the pertinent art based upon review of the subject disclosure.

Referring to FIG. 3A, the preferred embodiment of the emulator runs on any Microsoft Windows operating system and an status view screen is referred to generally by the reference numeral 100. It is envisioned that the actual number and arrangement of the user interface screens may vary according to the particular design and application. To launch the emulator 12, the user can start through the normal means of double-clicking on its file icon, or selecting it from the <Start> Menu, if the <Start> menu is configured to do so. Following startup, the main application window (not shown) appears, along with the status view as shown in FIG. 3A. Preferably, the first user view to appear when the user starts the emulator application or selects File→New is the Status View 100. Depending on the DLL files the user installed when installing the emulator 12, the emulator 12 may use the TCP/IP as the default communication protocol, as noted by the "New Core: Protocol=Internet Protocol(IP)" text 102 in FIG. 3A. At this point, the emulator has typically not read an ICD file; otherwise, the emulator would display the ICD file name and path next to the "Current ICD File" in the same text status block. The ICD file defines which communication protocol (such as, without limitation, TCP/IP or MIL-STD-1553) to use, and as such the user does not have to be concerned with choosing a protocol.

Referring to FIG. 3B, a load ICD file dialog box is referred to generally by the reference numeral 104. To load the ICD file 24, the user defines the ICD file to use by selecting the menu item "File->Load Interface Control Document (ICD)," browsing for the ICD file to load, and clicking "Open." After the emulator application loads the ICD file 24, the component configuration dialog box 106 will pop up as shown in FIG. 3B1. The user can choose the component or components to emulate (or monitor), and other protocol-specific configuration data. After clicking "OK" in the component configuration dialog box 106, the emulator application loads the ICD file 24 and displays a preferences dialog box 108 as shown in FIG. 3B2. The preferences dialog box 108 allows the user to select the number of decimal digits for real numbers.

The application window of the emulator application includes a "File->New" command, chosen from the "File->New" menu item. The "File->New" command will close the current emulation and create a new one. The new emulation will not have an ICD file 24. The user can save the current emulation in an "emulator unique file" (.mii) by choosing "File→Save," or "File→Save As," or the save menu button. In a preferred embodiment, the emulator 12 writes the following information data items to the file when the user chooses this option: (i) the ICD file path and file name; (ii) the content of the ICD; (iii) any configuration data that the user has set, including the components currently emulated, and the communication parameters for each component (for TCP/IP or UDP/IP protocols for example, the emulator would save the IP address and port number for each component); (iv) all the predefined outgoing messages that the user has defined; (v) all message sequences; (vi) the paths of the Behavior Objects that the user has loaded; (vii) the sizes and positions of the message views; and (viii) other internal configuration data.

The application window of the emulator application also includes a "File->Open" command, chosen from the "File->Open" menu item, which enables the user to open an emulation file (.mii) the user saved previously. After reading this file, the emulator 12 restores the emulation saved in the file.

In another embodiment, the emulator provides the capability to resolve inconsistencies between the data stored in a .mii file and changes made to the associated ICD file. For example, consider the following sequence of events: the user emulates the tower's computer, creates a set of predefined "Destination Info" messages, saves the emulation in a .mii file and closes the emulator, changes the name of the "Precipitation Type" file to "Precip. Type" in the ICD, and opens the .mii file again with the emulator. The emulator will sense the inconsistency between the saved predefined messages and the message type defined in the ICD, and ask the user for help in resolving the inconsistency.

Referring to FIG. 3C, during emulation and monitoring, a typical in message view screen 110 is shown. The In Message View Screen 110 displayed by the emulator application 12 allows the user to view the following:

Fields Grid: Field names and their decoded, human-readable values in the most recently received message, Raw Data Grid: hexadecimal representation of the most recently received message, History: a human-readable "history" of the value of the fields of previously received messages.

Also, the In Message View 110 will display information about a field in a "tooltip" window. This information includes:

the field's name, human-readable value, hexadecimal value, binary value, the field's position in the message, the field's length, the field's type.

Other such information may be included in this tooltip window in the future. The emulator application brings up this tooltip window automatically when the user rests the mouse pointer on a field in the Fields Grid.

The "Bigger" and "Smaller" buttons horizontally resize the Fields Grid.

Each In Message View can also display multiple instances of a particular message type in the Fields Grid in different columns. In other words, the In Message View can display the most recent message data without overwriting previously displayed messages. The user can identify an "overwrite field" for a particular In Message View. When the user chooses an overwrite field, the In Message View will display multiple messages (in multiple columns), rather than just one message in one column. If a new incoming message's overwrite field has the same value as a previous message's overwrite field, the old message data is overwritten with the new in the appropriate column. If the new message's overwrite field does not have the same value as any other ones currently displayed, the emulator will create a new column and write the message data there.

Referring to FIG. 3D, the In Message Configuration Dialog 120 (brought up by clicking the "Config . . . " button) enables the user to configure: Overwrite fields; Logging options; for the In Message View's Message History; Whether or not to display byte offsets in the In Message View's Raw Data Grid; and How often to update the view with new message data.

Referring to FIG. 3E, the Outgoing Message View 122 enables the user to manually define the content of an outgoing message, and to send the outgoing message using the emulator application 12. This view has many of the same properties as the In Message View. As the user types in the values of the message's fields in the Fields Grid 124, the emulator 12 updates the hexadecimal representation of the message data in the Raw Data Grid 126. Likewise, edits to the Raw Data Grid 126 will result in corresponding automatic updates to the Fields grid 124. This view also keeps a history of transmitted messages, in human-readable format. To transmit the currently defined message, the user simply clicks the "Send" button 130. The Outgoing Message View 122 also has its own configuration dialog view 132 (bring it up via the "Config . . . " button), displayed in FIG. 3E2. The configuration dialog view 132 shares many of the same elements as the In Message Configuration Dialog.

Referring to FIG. 3F1, the Predefined Messages View 134 enables the user to define the content of multiple "predefined" outgoing messages. The Predefined Messages View 134 will display the predefined messages appropriate for the Out Message View that the user most recently put focus on. The user defines the content of a predefined message in the Fields Grid 136 on the right side of the view 134. The "New Default" button 138 allows the user to create a new predefined message with default data in the message fields (The ICD defines the default value for all fields). The "New Copy" button 140 allows the user to create a new predefined message whose content is copied from the currently selected predefined message. The "New Current" button 142 allows the user to create a new predefined message whose content is copied from the Out Message View.

Upon clicking these "New" buttons, the application allows the user to enter a name for the new predefined message in a small dialog 144, shown in FIG. 3F2. The small dialog 144 provides a default name for the user. The user selects the predefined message to operate on in the list box displayed in the bottom left hand corner of the view. The user is then able to quickly setup an outgoing message by clicking the "Move" button, which copies the content of the selected predefined message to the appropriate Out Message View. The user can then modify the content of the Out Message View and/or send the content. Clicking the "Send" button executes a "Move" as above, and also immediately sends the message. The user can modify the comments of each Predefined Message in the edit box in the upper left hand corner. These outgoing messages are saved when the user saves the emulation. This functionality is designed to minimize manual data entry in repetitive message formatting, allowing the user to define each message only once, and bring each up at will with a simple button click.

Shown in FIG. 3G, the Component Configuration Dialog 146 will pop up automatically when the user loads a new ICD file 24. The Component Configuration Dialog 146 enables the user to configure which components (from the ICD) the emulator application 12 shall emulate or monitor. In this example, this diagram displays the Component Configuration Dialog for the IP Protocol. The user can configure which components he wants to emulate, and the IP configuration parameters for the components (IP addresses and port numbers). The emulator application will display other similar dialogs for each communication protocol it supports. The Component Configuration Dialog 146 also pops up if the user selects Control->Component Config at the menu option.

Shown in FIG. 3H, the Sequence View 148 enables the user to define a sequence of outgoing messages and the delay between them. The user can bring up the Sequence View 148 by selecting the Sequence->Sequences menu option. The Sequence View 148 enables the user to define sequences of outgoing messages. The "Sequence Grid" displays the time, post-send time gap, message name and field values of each message in the sequence. At any time, the user can choose to play, stop, or pause the sequence. The diagram 148 displays the Play button 150, but the Stop button 152 and Pause 154 button are grayed out, since the scenario is not currently playing. The combo box 156 labeled "Current Seq" enables the user to choose the current sequence. The "New Seq" button 158 enables the user to create a new, blank sequence. The "Delete Seq" 160 will delete the entire sequence currently chosen, and the "Change Seq Name" 162 enables the user to change the name of the sequence currently chosen. Referring to FIG. 3H2, a Message Grid Popup 164 provides information to the user after a click on the Field Values column in a Message Sequence. This popup grid gives the user a more complete description of the content of the selected message in the sequence.

Referring to FIG. 3I, an Interpolation Dialog is referred to generally by the reference numeral 166. The "Number Messages Between" edit box 168 allows the user define how many messages to insert between the selected messages in the sequence. The "Inter-Message Delay" edit box 170 lets the user define the time delay between interpolated messages. The "Fields to Interpolate" grid 172 lets the user identify which fields to interpolate. The subject application prevents the user from selecting non-numeric fields (such as character strings or Booleans). Clicking "OK" will cause the subject application to insert messages between the ones chosen previously, and will interpolate smoothly the fields selected in the grid to reflect a dynamically changing environment.

The Sequence View supports standard Copy, Cut, and Paste functions. That is, the user can select a number of messages, copy or cut them to the clipboard, and paste them to other places in the sequence. The user may even paste messages into a different sequence they were not copied or cut from. The user can choose the Copy, Cut and Paste functions by selecting the rows to copy or cut in the Sequence Grid, choosing Copy or Cut from the Edit menu or the popup menu via a right-click, selecting the appropriate row in the grid to execute the Paste operation, and choosing Paste from the Edit menu or the popup menu.

The Logging View 174 shown in FIG. 3J enables the user to record incoming and outgoing messages, and enables the user to view these messages in a human-readable format. The user can bring this view up by selecting Log->Message Log . . . or by clicking the "L" icon on the toolbar underneath the Main Menu. The user can start and stop logging messages with the button 176 marked "Press to begin recording." Upon activation, button 176 toggles to read "Press to stop recording" to allow for cessation of recording. At any time, the user can press the "Log All Messages" button 178 to log all message types or the "Log No Messages" button 180 to log none, and choose which message types individually to log in the "Messages to Log" grid 182.

The view displays the log in the grid in the center of the screen. It includes the time Mimic logged the message, the component that transmitted or received it, whether or not Mimic received or transmitted the message ("IN" or "OUT"), and finally the field names and field values of the message.

The view 174 also displays the total number of messages logged, and the total number of bytes in the logged messages. The user can set a limit on the amount of bytes or messages logged by clicking the "Set log limit" button 184. The user can also set a limit for both the byte count and number of messages simultaneously, and the emulator application 12 will stop logging when the first of these limits is hit. The user can bring up the Message Log Details View 186, shown in FIG. 3J2, by choosing the "Log->Message Details . . . " menu option from the main menu.

After logging completes, the user can command the emulator 12 to search for messages in the log that contain a field whose value meets certain criteria. The user can define this criteria through a dialog brought up by clicking the "Set Search Parameters" button in the Log View. For example, the user can search the log for all Destination Info messages whose Temperature field has a value of less than 59 degrees. After the user clicks the "Set Search Parameters" button, the dialog that pops up enables the user to define all these parameters. The user can then use the "Next" and "Prev" buttons to search through the log for messages that meet this criteria.

By clicking the "Save log to file" button in the Log View, the user can save the log to a text file. Before saving the log to a text file, the emulator application 12 gives the user a choice to save the log in a variety of formats, such as a spreadsheet-readable file, or a more human-readable text format. A "spreadsheet-readable" choice, for example, causes the emulator application 12 to save the file in a tab-delimited format, and arranges the fields of the message into columns, where each row stores a message. Most spreadsheet application can read this format, thereby enabling the user to operate on the logged message data with all the capabilities of spreadsheets, such as creating graphs and charts The "Scroll grid with log" check box in the Log View enables the user to choose to keep the most recent logged messages visible by scrolling the grid downward after messages accumulate beyond the size of the grid.

Referring to FIG. 3K, the Message Window Control View 200 allows the user to choose to restore or bring to the top any message view, all outgoing or all incoming message views of a component, or all message views of a component, depending on which radio button on the left the user selects. Additional radio buttons may be provided as system design can of course be particularized to specific user demands.

The user defines new messages or edits already-existing messages by bringing up the "Message Definition" Dialog 216, shown in FIG. 3K4. The user can choose "Insert a New Message . . . " or "Edit Message . . . " from either the "Sequence" menu or the Sequence Grid's popup menu (right click on the Sequence Grid to display the popup menu). In this dialog 216, the user chooses the Message Type 218 of the selected/new message, the content 224 of the message, and the delay 220 between the selected/ new message and the next message in the sequence. This dialog 216 also gives the user the ability to choose a Predefined Message 222 for the selected/new message.

By selecting multiple messages and bringing up the Message Definition Dialog 216, the user can set all the selected messages to the content of the Message Definition Dialog 216 when the user clicks "OK." The user can also edit only the Post-Send Delay value 220 for one or more messages by selecting the messages in the Sequence Grid and choosing "Edit Post-Send Delay Time . . . " from the "Sequence" or popup menu. The Post-Send Delay Dialog 226, shown in FIG. 3K5, is accessed through dialog 216.

Referring to FIG. 3K6, the "Loop Control" button 228 enables the user to choose the number of times the sequence will repeat when played. The user can also choose to repeat the sequence an infinite number of times. The Sequence View 228 displays the maximum number of loops and the current loop count next to the "Loop Control" button.

If the user checks the "Play on Emulation Start" check box in the Sequence View and saves the emulation, the sequence will play automatically upon loading the emulation file, after the delay defined in the "Delay (msecs)" edit box. To make this happen, the user must save the emulation to an emulation file. The "Interpolate" button in the Sequence View brings up the Interpolation Dialog, shown in FIG. 3I. Before pressing this button, the user must select two messages in the sequence (the user can highlight message by clicking on a cell in the left-most column). The Interpolation Dialog enables the user to insert messages in between the selected messages, and smoothly increment the value of numeric message fields in the inserted messages.

The ICD Editor Main View 240 show in FIG. 3L provides the principal functionality associated with the creation, editing, and review of the ICD file 24 in the emulator 12. In a preferred embodiment, the emulator 12 has the ability to apply stylesheets (like XSL) to an ICD for easy display in a web browser. Preferably, the ICD file 24 is already in XML format.

Preferably, the ICD Editor 240 currently has the Tower and Airliner ICD file loaded, and may access several different functions from this one window. In the "High-level ICD Information" section 242, the user can define the type of protocol used for this ICD by clicking the "Edit" button 246. In the "Components" section 248, the user can create a new component, edit an already-existing component, or delete a component. The "Transmitting Component" box 250 and "Receiving Component" box 252 determine the message types that the application lists in the list box 254 in the "Messages" section 256. In the "Messages" section 256, the user can create a new message type, edit an already-existing message type, or delete a message type (the application, for sake of brevity, calls a message type simply a "message"). The "Transmitting Component" box 250 will transmit message types shown in the list box. The "Receiving Component" box 252 will receive message types shown in the list box.

The Message Fields 260 grid displays all fields in the message type currently highlighted on the bottom left in the list box. In this example, the diagram shows the message fields of the Destination Info message in the Tower and Airliner ICD. When editing a message, the user can define comments for that message, and the diagram shows these comments at the bottom left.

The grid 262 marked "Enumerations:" shows the enumerations for the selected message field within the Message Fields grid. The application 12 would not show any entries in grid 262 if the selected field in the Fields Grid showed a type other than "ENUM." From within the Field Editor Dialog, the user can define comments for that field, and the application shows these comments at the bottom right. In this example, the selected Message Field 264 is "Wind Direction", with entries in the "Enumerations:" field representing the possible values for wind direction.

The Component Editor Dialog 266 shown in FIG. 3M enables the user to define the component's name. If the user defined the protocol for this ICD as UDP or TCP, other widgets may appear on this dialog. For example, if the user defined the protocol as 1553, an edit box would appear that would enable the user to define the components Remote Terminal address.

The user can bring this dialog up by clicking on the "New Component" or "Edit Component" buttons in the Main View.

Referring to FIG. 3N, the Message Editor Dialog 270 is shown. The Message Editor Dialog 270 enables the user to define the message type's name, the message type's ID, and the message type comments. When using the UDP and TCP protocols, the emulator application 12 uses message type IDs to identify the type of incoming message, which enables it to parse the message correctly. The user can bring this dialog up by clicking on the "New Message" or "Edit Message" buttons in the Main View.

The Field Editor Dialog 272 shown in FIG. 3O, enables the user to define a field's name, bit-length, type, and comments. If the user chooses "REAL" as the field's type, the dialog 272 also enables the user to define the field's LSB. The user can also define the field's enumerations. The user can bring up this dialog by right clicking on a field in the Fields Grid and choosing the "Insert" or "Edit" menu items.

Referring to FIG. 3P, the Enumeration Editor Dialog 274 enables the user to define the text that the emulator application 12 will display for a field that has a particular integer value (the "enumeration"). The user can bring up this dialog 274 from within the Field Editor Dialog by right clicking on an enumeration within the Enumerations Grid and choosing the appropriate menu item. It would be appreciated by those of ordinary skill in the art that the ICD Editor could support a variety of features now known and later developed.

While using the Emulator 12, the user can Open, Save, and Save As a .mii file through the standard file operations most windows applications provide for you in the File menu in the upper left-hand corner of the application's main window. Open, Save, and Save As read and write the Emulator Files, whose Windows extension is ".mii." When the user saves the current emulation to a mii file, the emulator writes to the file all the information needed to replicate the same emulation in between emulator sessions, including: the ICD file path; the content of the ICD; all message sequences defined by the user; all predefined outgoing messages; the size and position of all message views; and other various configuration data as would be appreciated by those of ordinary skill in the pertinent art. After starting the emulator application 12, the user can choose to open an ICD file 24 (which exists in XML text format) to begin emulating or monitoring a set of components. The user can then save the session in a mii file by choosing "Save" or "Save As." The "New" command on the file menu simply creates a new, empty emulation. After choosing "New," the user must choose an ICD file 24 to load to begin emulating a component or set of components. The user can do this with the "Load Interface Control Document" option on the file menu.

The ICD Editor View 240 implements the file operations that windows applications typically support on their file menu, including "New," "Open," "Save," and "Save As." Open, Save, and Save As read and write the ICD File(s) 24, whose Windows extension is ".xml." Selecting "New" creates a new ICD file that the user can begin to define. When the user chooses "Save" or "Save As," the ICD Editor formats the current user-defined ICD information into a format readable by the emulator and the ICD Editor and saves it to a file. "Save" simply saves it to the file it was last opened from or saved to. "Save As" allows the user to choose the directory to which the ICD is saved. Selecting "Open" allows the user to search for and open a previously-saved ICD File, thus allowing the user to view and further edit the ICD. The ICD Editor formats the ICD file in "XML" format. XML stands for "Extensible Markup Language." XML is an industry standard text format used widely in the commercial software industry.

Menu and Toolbar Options

The following Tables 1-10 describe the menu options, their resulting actions, and their associated figures in a preferred embodiment of both the Emulator and the ICD Editor. Toolbar buttons are also described, since applications written for Microsoft Windows typically display the same options to the user in both menus and toolbar buttons. Note also that Microsoft Windows supports two different menu types: the "Main Menu," "pull-down" options spread across the top of most applications, and "context" or "pop-up" menus, which the user can display by right-clicking on some views, dialogs, and windows. The application will disable (i.e. "gray-out") many menu items listed below if the window that responds to the user's menu item selection is not in focus. FIG. 4 illustrates the emulator toolbar icons 300 with a brief explanation thereof. FIG. 5 illustrates the ICD editor icons 400 with a brief explanation thereof.

TABLE 1

"File"

| Menu Option | Action | FIG. |
| --- | --- | --- |
| Load Interface Control Document (LCD) File . . . | Enables the user to load an ICD File to begin emulation | 3B |
| New Emulation | Create a new emulation | 3A |
| Open Emulation . . . | Open an existing emulation file (.mii) and begin emulation | N/A |
| Close Emulation | Closes the current emulation | N/A |
| Save Emulation | Saves the current emulation to a .mii file | N/A |
| Save Emulation As . . . | Saves the current emulation to a .mii file of the user's choice | N/A |
| Load a New Behavior Object . . . | Loads a Behavior Object into the emulation | N/A |
| View Current Behavior Objects . . . | Bring up the Behavior Objects Control dialog | 3K1 |
| (Recent Files List) | Contains the names of the last several emulation files opened. Selecting one loads that particular emulation file. | N/A |
| Exit | Closes the Application | N/A |

TABLE 2

"Edit"

| Menu Option | Action | FIG. |
|---|---|---|
| Undo | Undo. | N/A |
| Cut | Cut the selected message or set of messages in an outgoing sequence to the clipboard. | N/A |
| Copy | Copy the selected message or set of messages in an outgoing sequence to the clipboard. | N/A |
| Paste | Paste messages from the clipboard to the selected position in the current outgoing message sequence. | N/A |

TABLE 3

"Message"

| Menu Option | Action | FIG. |
|---|---|---|
| Show info for current field | Bring up the Field Info View for the currently selected field in the Message View. | 3K2 |
| Show comments for current field | Bring up the Comments Dialog for the currently selected field in the Message View. | N/A |
| Show comments for current message | Bring up the Comments Dialog for the Message View currently in focus. | N/A |
| Send message | Send the message in the Message currently in focus. Grayed-out if message is incoming. | N/A |
| Configure view . . . | Bring up the Message View's Configuration Dialog. | 3D, 3E2 |
| Show Parsed Msg Data | Check to show the Message Data Grid, uncheck to hide it. | N/A |
| Show Raw Data | Check to show the Message Raw Data Grid, uncheck to hide it. | N/A |
| Show History | Check to show the Message View's History, uncheck to hide it. | N/A |
| Raw Data Editor . . . | Bring up the Raw Data Editor. | 3K3 |
| Save as a Predefined Message | Enables the user to define a new Predefined Message based on the content of the current Message View. | N/A |

TABLE 4

"Control"

| Menu Option | Action | FIG. |
|---|---|---|
| Component Config . . . | Bring up the Component Configuration Dialog. | 3B1 |
| Preferences . . . | Bring up the Preferences Dialog | 3B2 |

TABLE 5

"Sequence"

| Menu Option | Action | FIG. |
|---|---|---|
| Sequence . . . | Bring up a new Sequence View | 3H |
| Insert New Message . . . | Bring up the Message Definition Dialog (defaulted to "Insert") | 3K4 |
| Edit Current Message . . . | Bring up the Message Definition Dialog (defaulted to "Edit") | 3K4 |

TABLE 5-continued

"Sequence"

| Menu Option | Action | FIG. |
|---|---|---|
| Edit Post-Send Delay Time . . . | Bring up the Post-Send Delay Dialog | 3K5 |
| Cut | Cuts either: | N/A |
| | 1) The selected message or set of messages in a sequence to the clipboard, or 2) The selected text to the clipboard | |
| Copy | Copies either: | N/A |
| | 1) The selected message or set of messages in a sequence to the clipboard, or 2) The selected text to the clipboard | |
| Paste | Pastes either: | N/A |
| | 1) Message or a set of message into the selected position in a sequence from the clipboard 2) The selected text from the clipboard to the currently selected edit box | |
| Play the Sequence | Play the current sequence from the beginning | N/A |
| Pause the Sequence | Pauses the current sequence | N/A |
| Stop the Sequence | Stops the currently sequence | N/A |
| Loop Control . . . | Brings up the Loop Control Dialog | 3K6 |
| Interpolate . . . | Brings up the Interpolation Dialog | 3I |

TABLE 6

"Log"

| Menu Option | Action | FIG. |
|---|---|---|
| Message Log . . . | Check to Bring up the Log View, uncheck to close it. | 3J |
| Message Details . . . | Bring up the message details for the currently selected message in the Log. | 3J2 |
| Begin Recording/Stop Recording | Begin Recording or Stop Recording, depending on the Log's current state. | N/A |
| Set Log Limit . . . | Bring up the "Set Logging Limits" dialog. | 3J3 |
| Set Search Parameters . . . | Bring up the "Log Search Parameters" dialog | 3J4 |
| Next | Highlight the next message that matches the search parameters defined in the "Log Search Parameters" | N/A |
| Previous | Highlight the previous message that matches the search parameters defined in the "Log Search Parameters" | N/A |
| Save Log to File . . . | Save the current message log to a file | N/A |

TABLE 7

"Protocol": The content of this menu is protocol-dependent; (TCP/IP: None)(UDP/IP: None)(COM/Serial Port: None) (MIL-STD-1553)

| Menu Option | Action | FIG. |
|---|---|---|
| Excalibur Functions . . . | Brings up the Excalibur Functions Dialog | N/A |
| Excalibur RT Config . . . | Brings up the Excalibur RT Configuration Dialog | N/A |
| BC Command Frame Report . . . | Brings up the Frame Report Dialog | N/A |

TABLE 8

"View"

| Menu Option | Action | FIG. |
|---|---|---|
| Toolbar | Check to show the toolbar, uncheck to hide it | N/A |
| Status | Check to show the status bar, uncheck to hide it | N/A |

TABLE 9

"Window"

| Menu Option | Action | FIG. |
|---|---|---|
| Cascade | Cascades all open windows | N/A |
| Tile | Tiles all open windows | N/A |
| Arrange Icons | Arranges all minimized windows | N/A |
| (Window List) | The contents of this list contain identifiers for all windows that appear within the application. The Emulator will update this list | |

TABLE 9-continued

"Window"

| Menu Option | Action | FIG. |
|---|---|---|
| | dynamically. Selecting one of these window identifiers will restore the identified window and bring it to the top of the Z-order. | |

TABLE 10

"Help"

| Menu Option | Action | FIG. |
|---|---|---|
| Help Topics | Brings up the Mimi help documentation | N/A |
| About Mimic | Brings up the "About Box" Dialog | N/A |

The following Table 11 illustrates the emulator context menus of a preferred embodiment. Context menus appear when the user right-clicks on some views and windows. The tables identify the views/windows where context menus can appear, the main menu (the menu displayed across the top of the application) that the context menu derives from, and any differences between the main menu it derives from.

TABLE 11

| View/Window | Main Menu Derived from | Differences |
|---|---|---|
| Log View | Log | "Message Log . . ." option is deleted. |
| Sequence Grid | Sequence | "Sequences . . ." option is deleted. |
| Incoming and Outgoing Message Views | Message | - None - |

The following Tables 12-16 illustrate the ICD editor mail menu options. Preferably, the application will disable (i.e. "gray-out") many menu items listed below if the window that responds to the user's menu item selection is not in focus.

TABLE 12

"File"

| Menu Option | Action | FIG. |
|---|---|---|
| New | Create a new ICD | 3L |
| Open | Open an existing ICD file (.xml) | N/A |
| Close | Closes the current ICD | N/A |
| Save | Save the current ICD | N/A |
| Save As... | Save the current ICD to a .xml file of the user's choice | N/A |
| (Recent Files List) | Contains the names of the last several ICD files opened. Selecting one loads that particular ICD file. | N/A |
| Exit | Closes the ICD Editor | N/A |

TABLE 13

"Edit"

| Menu Option | Action | FIG. |
|---|---|---|
| Undo | Not currently implemented (options remains disabled/grayed-out). | N/A |

TABLE 13-continued

"Edit"

| Menu Option | Action | FIG. |
|---|---|---|
| Cut | Cuts the selected message or set of messages, or field or selected fields, to the clipboard. | N/A |
| Copy | Copies the selected message or set of messages, or field or selected fields, to the clipboard. | N/A |
| Paste | Paste message(s) or Field(s) from the clipboard. | N/A |

TABLE 14

"View"

| Menu Option | Action | FIG. |
|---|---|---|
| Toolbar | Check to show the toolbar, uncheck to hide it | N/A |
| Status | Check to show the status bar, uncheck to hide it | N/A |

TABLE 15

"Window"

| Menu Option | Action | FIG. |
|---|---|---|
| Cascade | Cascades all open windows | N/A |
| Tile | Tiles all open windows | N/A |
| Arrange Icons | Arranges all minimized windows | N/A |
| (Window List) | The contents of this list contain identifiers for all windows that appear within the application. The Emulator will update this list dynamically. Selecting one of these window identifiers will restore the identified window and bring it to the top of the Z-order. | |

TABLE 16

"Help"

| Menu Option | Action | FIG. |
|---|---|---|
| Help Topics | Brings up the ICD Editorhelp documentation | N/A |
| About Mimic | Brings up the "About Box" Dialog | N/A |

The following Tables 17 and 18 illustrate the ICD editor main menu options. Preferably, the application will disable (i.e. "gray-out") many menu items listed below if the window that responds to the user's menu item selection is not in focus.

TABLE 17

Location: Main Window, Message Fields Grid

| Menu Option | Action | FIG. |
|---|---|---|
| Insert New Field | Brings up the Field Editor Dialog | 3O |
| Edit Current Field | Brings up the Field Editor Dialog | 3O |
| Delete Current Fields | Deletes the selected fields from the message. | N/A |
| Copy Field | Copies the selected fields to the clipboard | N/A |
| Cut Field | Cuts the selected fields to the clipboard | N/A |
| Paste Field(s) from Clipboard | Inserts the fields on the clipboard into the selected position in the Message Fields Grid | N/A |

TABLE 18

| Menu Option | Action | FIG. |
|---|---|---|
| | Location: Main Window (anywhere except the Message Fields Grid) | |
| New Message | Brings up the Message Editor Dialog | 3N |
| Edit Current Message | Brings up the Message Editor Dialog | 3N |
| Delete Current Message | Deletes the selected fields from the message. | N/A |
| Copy Message | Copies the selected message to the clipboard | N/A |
| Cut Message | Cuts the selected message to the clipboard | N/A |
| Paste Messages from Clipboard | Inserts the message on the clipboard into the ICD. The ICD Editor will associate the new message with the Transmitting and Receiving Components displayed in the Main Window. | N/A |

It is envisioned that in order to use the emulator 12, a user would download the emulator 12 on to a computer which is configured for use thereof. If the communication protocols intended for use demand installation of interface cards and drivers, the installation instructions of the vendor for that card must be followed prior to configuring the emulator 12. Most computer manufactures configure their computers to support TCP/IP, UDP/IP and COM/Serial Port communication protocols before shipment, so installing interface cards and drivers for these protocols may be unnecessary. For other protocols, the user may need to install the proper interface cards and drivers as would be known to those of ordinary skill in the pertinent art.

In a preferred embodiment, the steps for installation and configuration of the emulator 12, attached hereto in the appendix, are outlined below to illustrate a typical desirable configuration although a multitude of acceptable configurations are readily available. The installation and configuration consists of the following steps:

1) Install the "Visual C++, version 6.0" software from the Microsoft Corporation. Preferably, the emulator 12 was created with Visual C++ as the development environment.
2) Install the "Objective Grid, version 8.0" software from the Stingray corporation. This third-party software enables developers to use spreadsheet-like grids in their applications. The emulator 12 makes extensive use of the Objective Grid software.
3) If the communication protocols demand installation of interface cards and drivers, follow the installation instructions of the vendor for that card. Most computer manufactures configure their PCs to support TCP/IP, UDP/IP and COM/Serial Port communication protocols before shipment, so installing interface cards and drivers for these protocols may be unnecessary. For other protocols, the user may need to install the proper interface cards and drivers.

Preferably, the emulator 12 supports at least five communication protocols: ARINC 429, TCP/IP, UDP/IP, COM/Serial Port, and MIL-STD-1553B. It is envisioned that one skilled in the pertinent art will appreciate the use in other communications protocols currently in use or developed in the future after reviewing the subject disclosure.

Still referring to the software appendix version of the emulator 12 so that those having ordinary skill in the art to which the disclosure appertains will more readily understand how to make and use the same, reference may be had to the executable files contained herein as detailed below in Table 19.

TABLE 19

| Executable File | Developed By |
|---|---|
| Utilities.dll | Inventor |
| MsgLibrary.dll | Inventor |
| EmulatorCore.dll | Inventor |
| IPProtocol.dll | Inventor |
| IPProtocolWrapper.dll | Inventor |
| FileProtocol.dll | Inventor |
| COMPortProtocol.dll | Inventor |
| COMPortProtocolWrapper.dll | Inventor |
| Mfc42.dll | Microsoft |
| Ogas80.dll | Stingray |
| CoreManager.dll | Inventor |
| 1553Protocol.dll | Inventor |
| 1553Protocol Wrapper.dll | Inventor |
| 1553Excalibur.dll | Inventor |
| 1553ExcalDriverWrapper.dll | Inventor |
| ConfigMgr.dll | Inventor |
| Pcmcepms.dll | Excalibur |
| Mimic Zenith.exe | Inventor |
| Mimic Basic.exe | Inventor |
| ICDEditor.exe | Inventor |
| Example ICD.xml | Inventor |

The Emulator 12 has two separate versions, embodied in 2 executable files: Mimic Zenith.exe, and Mimic Basic.exe. Both are identical except that Mimic Basic cannot load ICD files, only Emulation files, whereas Mimic Zenith can load both. It is envisioned that some potential users will wish to have their Emulation files generated for them, and remain unconcerned about ICD files. Mimic Basic would be appropriate for such a situation.

While the invention has been described with respect to preferred embodiments, those skilled in the art will readily appreciate that various changes and/or modifications can be made to the invention without departing from the spirit or scope of the invention as defined by the appended claims.

What is claimed is:

1. A universal system component emulator for use in a computing environment having a plurality of components, the emulator comprising:
   a computer having a memory, the memory storing therein:
     first means for i) reading one of a plurality of ICD files to configure the emulator accordingly so that the emulator can encode and decode machine data into a human readable format, wherein each ICD file describes how information is encoded in data messages passed between the components of the computing environment and interface requirements between in the computing environment, ii) providing an interface to a user, iii) reading the plurality of ICD files to allow configuration based upon a read ICD file, iv) generating responses to incoming and outgoing messages, v) loading DLL files and vi) executing DLL files;
     second means for encoding outgoing messages in a machine format;
     third means for decoding the incoming messages;
     fourth means for transmitting the outgoing messages to a driver and receiving incoming messages from the driver;
     fifth means for logging the incoming messages from the fourth means, and logging the outgoing messages from the first means; and
     sixth means for displaying the incoming and outgoing messages to the user in human readable format.

2. A universal system component emulator as recited in claim 1, wherein the first means for reading, providing, generating and loading is an emulator core interface.

3. A universal system component emulator as recited in claim 1, wherein the second means for decoding is a sequence object.

4. A universal system component emulator as recited in claim 1, wherein the second means plays, pauses and stops a sequence of the incoming and outgoing messages.

5. A universal system component emulator as recited in claim 1, wherein the third means for decoding is a message log.

6. A universal system component emulator as recited in claim 1, wherein the third means records the incoming and outgoing messages.

7. A universal system component emulator as recited in claim 1, wherein the fourth means for transmitting is a protocol specific interface.

8. A universal system component emulator as recited in claim 1, wherein the fifth means for logging is a message state.

9. A universal system component emulator as recited in claim 1, wherein the sixth means for displaying is a user interface.

10. A universal system component emulator as recited in claim 1, wherein the sixth means passes user commands to the first means.

11. A computer readable medium whose contents cause a computer system to perform emulation of a component in an environment so that a user can read data transmitted to and from the emulated component, the computer system having a program with functions for invocation by performing the steps of:
 a) defining interface requirements that specify message formats related to data to be exchanged in a readable format;
 b) wherein a computer is in communication with the environment, the computer having a memory, storing a software application for component emulation in the memory of the computer;
 c) inputting the messaging interface requirements between the component and the environment into the software application to configure the software application, wherein the step of inputting the messaging interface requirements includes the steps of:
  i) determining a protocol of the interface requirements;
  ii) determining at least one component that the interface requirements define;
  iii) creating internal data objects that represent the at least one component;
  iv) determining messages that exist within the interface requirements;
  v) creating internal data objects to represent the messages;
  vi) inspecting a route of each message identified in the interface requirements;
  vii) associating a copy of each message with components identified by the route;
  viii) populating the internal message objects with data objects representing message elements defined in the interface requirements, wherein the message elements are fields and each field defines a location of the respective field in raw message data, bit length, data type and least significant bit value;
  ix) creating internal field objects that reflect fields in the interface requirements; and
  x) associating the internal field objects with an appropriate message element to enable the computer to extract field data from a received message and display the field data in a human readable format;
 d) launching the software application;
 e) sending, and receiving data exchanged between the component and the environment; and
 f) displaying the exchanged data in a human readable format.

12. A computer readable medium'as recited in claim 11, wherein the program has further functions for invocation by performing the step of selectively monitoring data exchanged between the component and another component in the environment when the sending and receiving of step e) is inactive.

* * * * *